US006480331B1

United States Patent
Cao

(10) Patent No.: US 6,480,331 B1
(45) Date of Patent: Nov. 12, 2002

(54) REFLECTION-TYPE POLARIZATION-INDEPENDENT OPTICAL ISOLATOR, OPTICAL ISOLATOR/AMPLIFIER/MONITOR, AND OPTICAL SYSTEM

(75) Inventor: Simon Cao, San Mateo, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/437,791

(22) Filed: Nov. 10, 1999

(51) Int. Cl.$^7$ ............................................... G02B 27/28
(52) U.S. Cl. ...................... 359/484; 359/281; 359/282; 359/487; 359/495; 359/497; 572/703; 385/6; 385/24; 385/27; 385/31; 385/34; 385/119
(58) Field of Search ................................. 359/281, 282, 359/484, 487, 495, 497; 372/703; 385/6, 24, 27, 31, 34, 119

(56) References Cited

U.S. PATENT DOCUMENTS

| | | |
|---|---|---|
| 4,548,478 A | 10/1985 | Shirasaki |
| 4,712,880 A | 12/1987 | Shirasaki |
| 5,033,830 A * | 7/1991 | Jameson ..................... 359/484 |
| 5,283,846 A | 2/1994 | Toyonaka et al. |
| 5,499,132 A | 3/1996 | Tojo et al. |
| 5,606,439 A | 2/1997 | Wu |
| 5,689,360 A | 11/1997 | Kurata et al. |
| 5,768,005 A | 6/1998 | Cheng et al. |
| 5,768,015 A | 6/1998 | Pattie |
| 6,122,110 A | 11/1998 | Toyanaka et al. |
| 5,912,766 A | 6/1999 | Pattie |
| 6,088,153 A | 7/2000 | Anthon et al. |
| 6,169,064 B1 | 1/2001 | Cao ............................ 356/519 |
| 6,310,690 B1 | 10/2001 | Cao et al. .................... 356/519 |

FOREIGN PATENT DOCUMENTS

EP   0 123 456 A2   10/1984

OTHER PUBLICATIONS

PCT Notification of Transmittal of International Preliminary Examination Report, mailed Feb. 19, 2002, including PCT International Preliminary Examination Report in International Application No. PCT/US00/30916 corresponding to co-pending application U.S. Serial No. 09/438,043.

Tanaka et al., Holographically formed liquid–crystal/polymer device for reflective color display, Journal of the Society for Information Display, Feb. 1994, vol. 2, No. 1, pp. 37–40.

(List continued on next page.)

*Primary Examiner*—Andrey Chang
*Assistant Examiner*—Craig Curtis
(74) *Attorney, Agent, or Firm*—Staas & Halsey LLP

(57) ABSTRACT

A variety of polarization independent optical isolators, including a single stage polarization independent optical isolator, a single stage broadband polarization independent optical isolator, a double stage polarization independent optical isolator, a double stage broadband independent optical isolator, and an optical isolator/monitor/amplifier, provide improved isolation characteristics and functionality. Optical systems are based upon input light traveling twice through the optical isolator/monitor/amplifier, and upon input light traveling twice through the optical isolator/monitor/amplifier connected in cascade with a double stage broadband polarization independent optical isolator.

11 Claims, 27 Drawing Sheets

OTHER PUBLICATIONS

U.S. patent application Ser. No. 09/438,043, Cao, filed Nov. 10, 1999.

Kreifeldt, E., "Avanex Emerges with 'Photonic Process' Technology", *http://news.fiberopticsonline.com/news-analysis/19990429-1759.html*, pp. 1–6, Apr. 29, 1999.

Written Opinion, mailed Aug. 29, 2001, in International Application No. PCT/US00/30916 (which corresponds to co-pending U.S. Serial No. 09/438,043).

Written Opinion, mailed Oct. 31, 2001, in International Application No. PCT/US00/30917 (corresponding to the above-mentioned U.S. Serial No. 09/437,791).

International Search Report, dated Apr. 4, 2001, for International Application No. PCT/US00/30917 (which corresponds to the above-mentioned U.S. Serial No. 09/437,791).

International Search Report, dated Mar. 1, 2001, for International Application No. PCT/US00/30916 (which corresponds to co-pending U.S. Serial No. 09/438,043).

Lee et al., "Bidirectional Wavelength–Selective Optical Isolator", Jul. 5, 2001, Electronics Letters, vol. 37, No. 14, pp. 910–912.

* cited by examiner

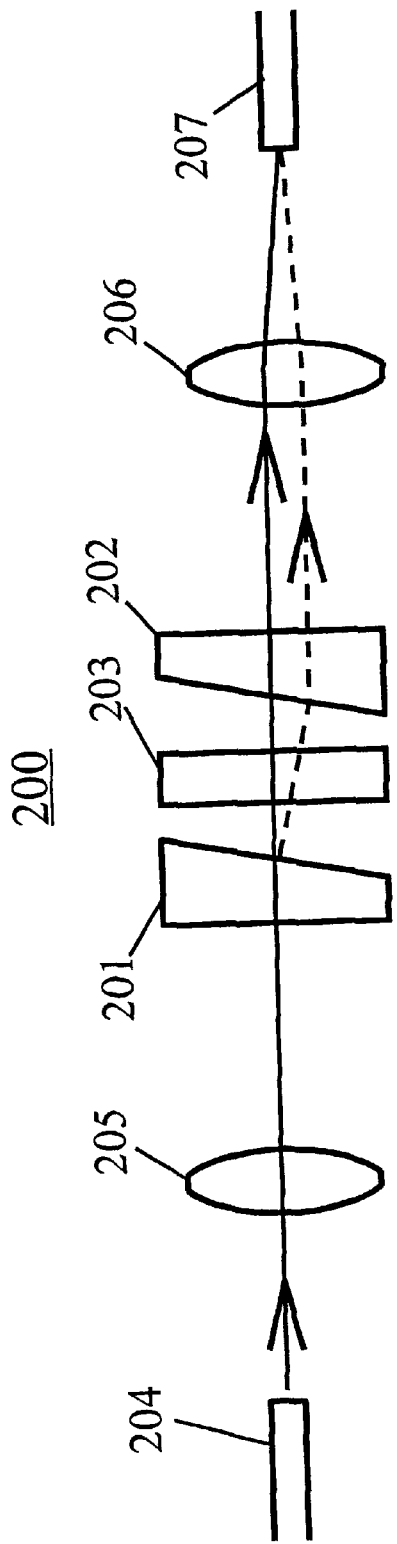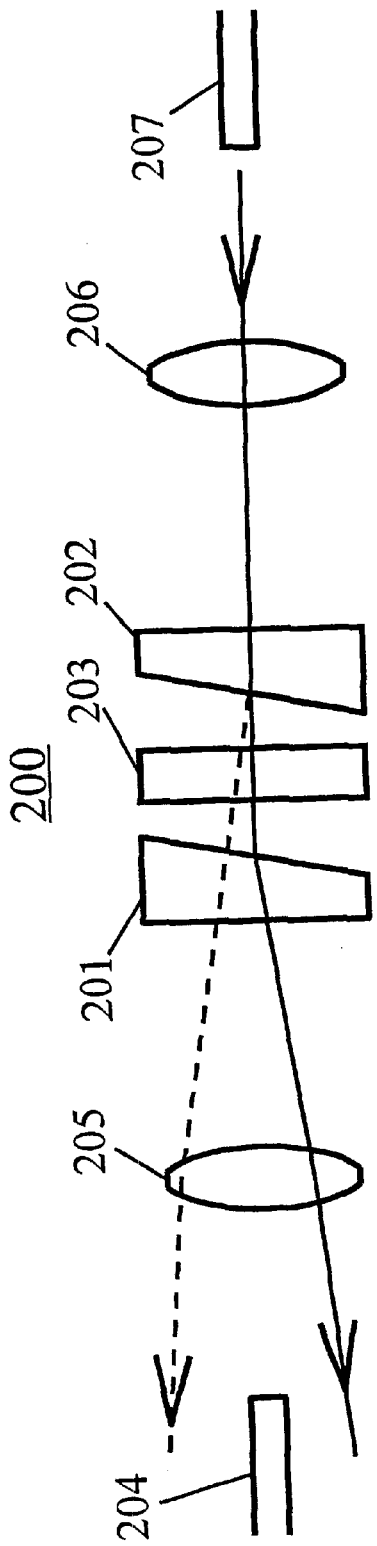

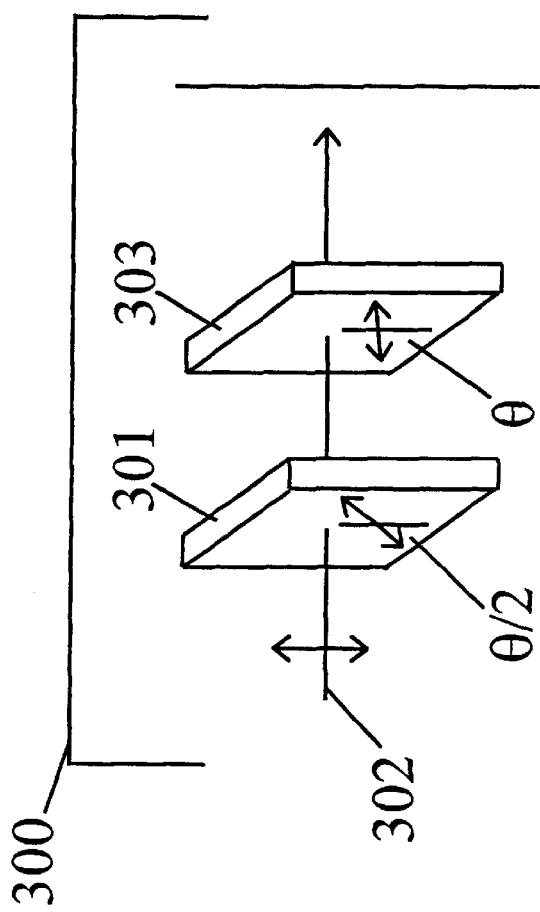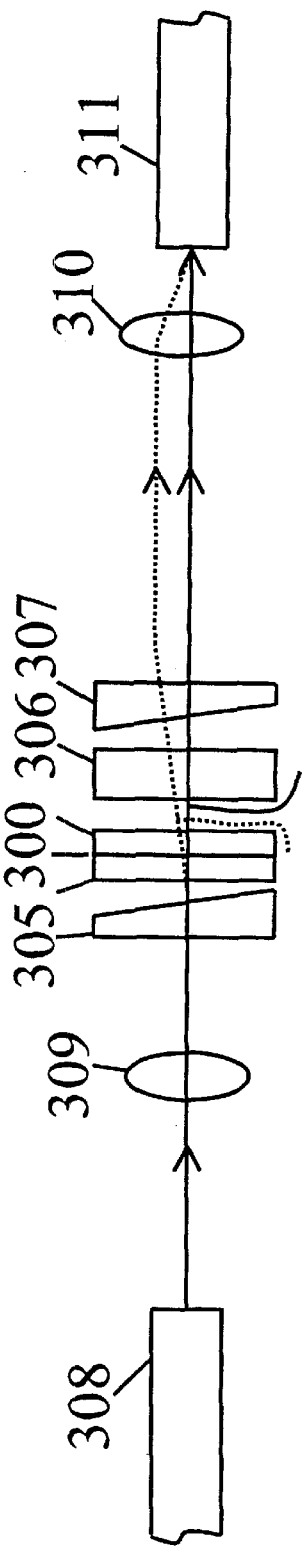
Figure 3A
PRIOR ART
Figure 3B
PRIOR ART

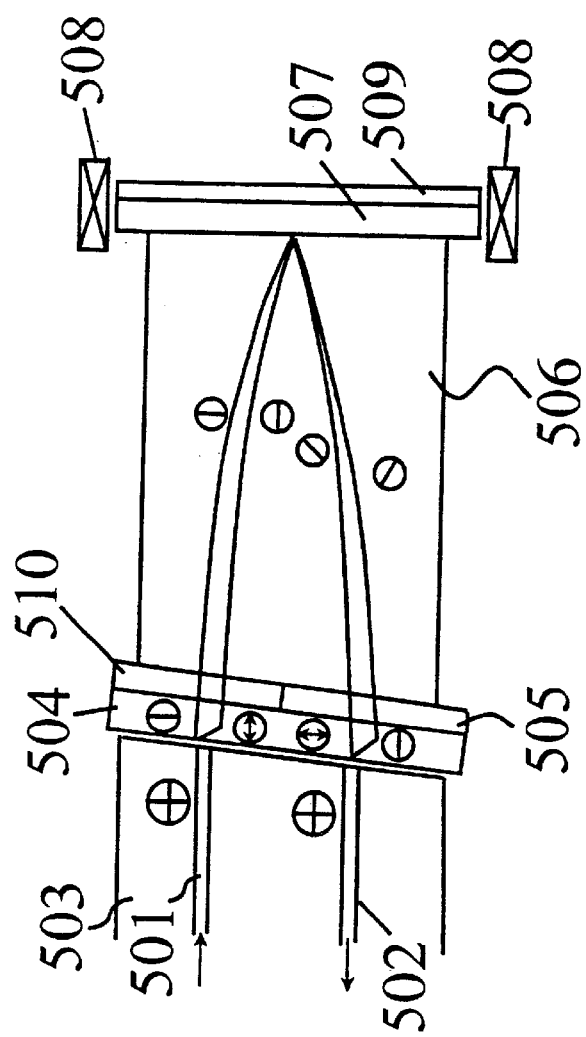
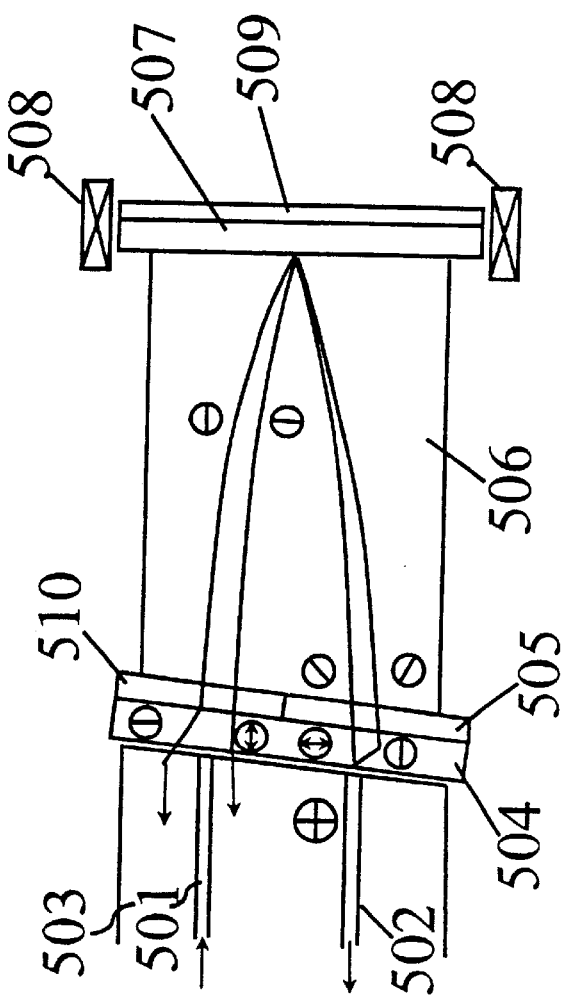
Figure 5A PRIOR ART
Figure 5B PRIOR ART

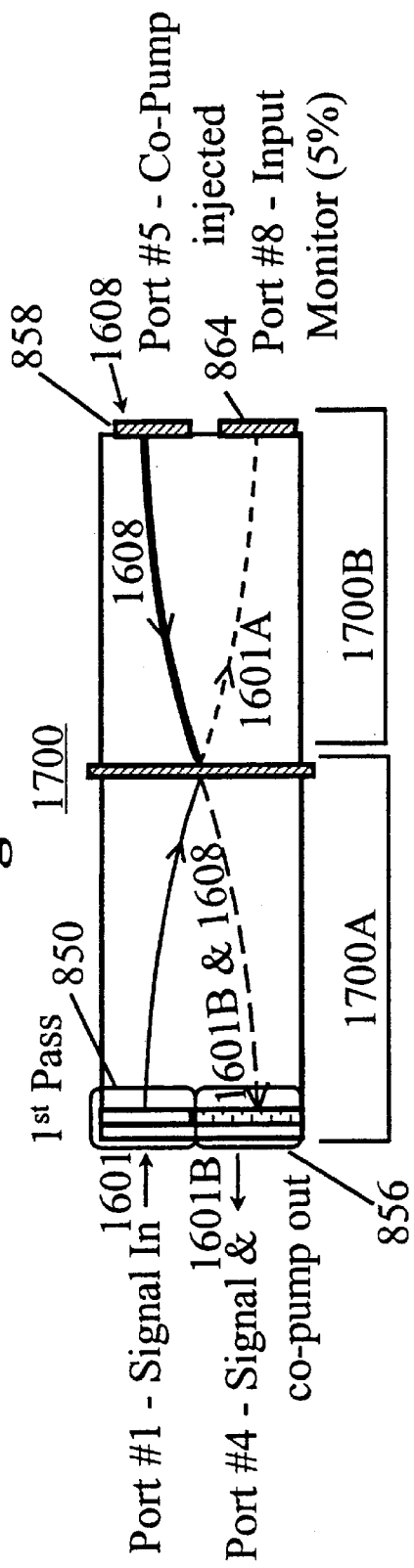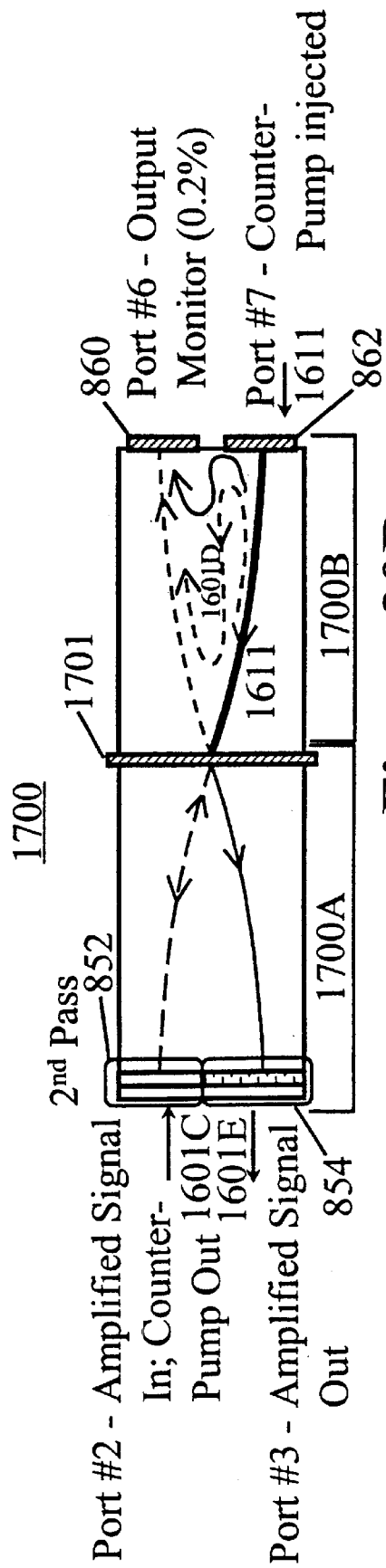
Figure 20A
Figure 20B

REFLECTION-TYPE POLARIZATION-INDEPENDENT OPTICAL ISOLATOR, OPTICAL ISOLATOR/AMPLIFIER/MONITOR, AND OPTICAL SYSTEM

BACKGROUND OF THE INVENTION

1. Field of the Invention

The present invention relates to a polarization independent optical isolator and, more particularly, to a reflection type of a polarization independent isolator.

2. Description of the Related Art

Optical fiber communication systems are now in practical use, and efforts are being made to advance research and development in this field. Accordingly, requirements for optical devices with more versatile functions have also increased.

An optical isolator is used as a functional component in a light transmission system such that light transmission therethrough is permitted in only one direction. A common use of optical isolators is as constituents of so-called "optical passive components" within optical amplifier systems, which are themselves important components of fiber-optic communication systems. Optical amplifier systems generally include optical isolators residing on both sides of an optical gain element such as an Er-doped fiber. Other optical passive components include Wavelength Division Multiplexers (WDM's) and signal monitors.

A polarization dependent optical isolator 100 is shown in FIG. 1 as an example of a traditional and typical optical isolator of the prior art. As illustrated in FIG. 1, there is provided a 45-degree Faraday rotation element (which is also referred to as a Faraday rotator) 101 which always rotates light input thereto in one direction by virtue of a permanent magnet. A polarizer 102 and an analyzer 103 are respectively placed before and after the Faraday rotation element, with the polarizer 102 and analyzer 103 being maintained at relative positions rotated 45 degrees with respect to one another.

As shown in FIG. 1, light emitted from an optical fiber 104 is divided or separated into parallel beams by a lens 105, and of the parallel beams, the polarizer 102 allows only polarized light oriented in a particular direction to pass through it; any other light is absorbed or reflected and eliminated. Polarized light that has passed through the polarizer 102 emanates from the Faraday rotation element 101 with its plane of polarization rotated by 45 degrees. The analyzer 103 is so arranged that polarized light with its plane of polarization rotated by 45 degrees passes through the analyzer 103, is focused by a lens 106 and enters an optical fiber 107.

On the other hand, and also as shown in FIG. 1, of light entering the polarization dependent optical isolator 100 in the reverse direction (from the optical fiber 107), only polarized light that is rotated by 45 degrees relative to the polarizer 102 may pass through the analyzer 103. Polarized light that has passed through the analyzer 103 will have its plane of polarization rotated by 45 degrees by the Faraday rotation element 101, and then emanates therefrom. The resulting light is rotated by 90 degrees relative to the polarizer 102 and is eliminated. Because of this, light in the forward direction propagates forwardly while light in the reverse direction is eliminated.

However, the isolator 100 just described is polarization dependent, even with respect to light propagating in the forward direction. More particularly, only specific, polarized light can pass through the isolator 100 in the forward direction, and the remaining propagating light is not effectively utilized because it is eliminated. Typical optical fibers used in light wave communication and data transfer systems do not preserve optical polarization over long distances. Light emanating from such a fiber consists of a randomly mixed state of light polarized in all directions, regardless of the state of polarization of light input to the fiber. Polarization-preserving fiber is well known but is too expensive for general use over long distances. Polarization independent optical isolators have therefore found a wide variety of applications in fiber-optic light wave systems.

FIG. 2A shows a well-known prior-art polarization independent optical isolator that is disclosed in U.S. Pat. No. 4,548,478. In the prior art polarization independent optical isolator 200 shown in FIG. 2A, tapered birefringent plates (tapered plates) 201 and 202 are placed on either side of a 45-degree Faraday rotator 203. Referring now to FIG. 2A, when light emanates from the optical fiber 204 into the prior art polarization independent optical isolator 200 and enters in the forward direction into the first tapered plate 201, the light is divided or separated into ordinary rays (o-rays) and extraordinary rays (e-rays) because of the differences in the index of refraction of the first tapered plate 201 due to polarization. These rays are refracted to different directions, and enter the 45-degree Faraday rotator 203 of FIG. 2A.

Ordinary and extraordinary rays of which planes of polarization are rotated 45 degrees by the Faraday rotator 203 are caused to enter the second tapered plate 202. The second tapered plate 202 is arranged such that an optical axis of the second tapered plate 202 is rotated 45 degrees around or about the light propagation direction relative to an optical axis of the first tapered plate 201. Therefore, the foregoing ordinary and extraordinary rays correspond to ordinary and extraordinary rays in the second tapered plate 202, respectively. Accordingly, ordinary rays and extraordinary rays that pass through the second tapered plate 202 emanate parallel to each other. These parallel beams of ordinary and extraordinary rays are focused onto the optical fiber 207 by the lens 206.

On the other hand, light traveling in the reverse direction (emanating from fiber 207 and traveling toward the direction of fiber 204 as shown in FIG. 2B) is divided into ordinary rays and extraordinary rays after entering the second tapered plate 202. The ordinary rays and the extraordinary rays are refracted to different directions by the second tapered plate 202, enter the 45 degree Faraday rotator 203, and are emitted therefrom with their plane of polarization rotated by 45 degrees.

For the light propagating in the reverse direction as shown in FIG. 2B, ordinary rays and extraordinary rays in the second plate 202 are converted to extraordinary rays and ordinary rays, respectively, in the first plate 201 by the Faraday rotator 203, so that the direction of each of these rays after passing through the first tapered plate 201 is different from that of incident light. Accordingly, when these rays are converged by the lens 205, focal points are formed outside the face of the fiber end 204 so that the light traveling in the reverse direction does not enter the optical fiber 204.

Since optical isolators typically utilize Faraday rotators and since the angular polarization rotation of Faraday rotators typically depends on wavelength of the light propagating therethrough, the wavelength region that provides the 45-degree rotation is very narrow. Therefore, a high isolation is maintained only in a very limited wavelength region, unless deviation from 45-degree rotation is compensated for.

In U.S. Pat. No. 4,712,880, two optical isolators and two polarization rotation compensators which are incorporated into these optical isolators are disclosed. The first polarization rotation compensator described in U.S. Pat. No. 4,712,880 is shown in FIG. 3A as element 300 and is composed of a combination of a half-wave plate 301 whose principal axis is inclined at an angle of θ/2 with respect to the plane of polarization of the incident light 302 and a quarter-wave plate 303 whose principal axis is inclined at an angle of θ with respect to the plane of polarization of the incident light 302, with the half-wave plate 301 and the quarter-wave plate 303 disposed in this order with respect to the forward light propagation direction.

The second polarization rotation compensator described in U.S. Pat. No. 4,712,880 (not shown) is similar except that the principal axis of the quarter-wave plate is parallel to the plane of polarization of the incident light, the principal axis of the halfwave plate is inclined at an angle of θ/2 with respect to the plane of polarization of the incident light, and the quarter-wave plate and half-wave plate are disposed in this order with respect to the forward light propagation direction.

The first optical isolator described in U.S. Pat. No. 4,712,880 utilizes the first polarization compensator, and is shown in FIG. 3B. This first optical isolator 304 comprises a first birefringent wedge plate 305, the first polarization rotation compensator 300 described herein above with reference to FIG. 3A, a Faraday rotator 306, and a second birefringent wedge plate 307, all arranged in this order with respect to the direction of propagation of the forward light. The forward light emanates from fiber 308, and is collimated by lens 309 onto the first birefringent plate 305. After passing through the first birefringent plate 305, the first polarization rotation compensator 300, the Faraday rotator 306, and the second birefringent plate 307, the light is focused by lens 310 into fiber 311, as shown in FIG. 3B.

The second optical isolator described in U.S. Pat. No. 4,712,880 (not shown) is similar except that the second embodiment of the polarization rotation compensator is used and the first birefringent wedge plate, the Faraday rotator, the second polarization rotation compensator, and the second birefringent wedge plate are arranged in this order with respect to the propagation direction of the forward light.

The prior-art optical isolators discussed above are of the transmission type. Reflection-type optical isolators can reduce the number of optical components, because some components are used twice due to the double pass characteristics of the device. FIG. 4 is a perspective view of a prior art reflection-type polarization independent optical isolator that is disclosed in U.S. Pat. No. 5,033,830. As shown in the prior art reflection-type polarization independent optical isolator 400 of FIG. 4, a pair of stacked reciprocal rotators 401 and 402, namely half-wave plates, a Faraday rotator 403, and reflector 404 (including lens 404-1 and mirror 404-2) are positioned in tandem adjacent to the birefringent plate 405. In the forward (transmitting) direction, a light wave signal exiting an optical fiber 406 is split into a pair of orthogonal rays by the birefringent plate 405. The orthogonal rays then pass through a first reciprocal rotator 401 and the Faraday rotator 403 for rotating polarizing light planes. The Faraday rotator 403 rotates polarizing light planes 22.5 degrees. The rotated rays are then redirected by the reflector 404 back through the Faraday rotator 403. After passing through the second reciprocal rotator 402, the orthogonal rays re-enter the same birefringent plate 405 where they are recombined and launched in an output fiber 407.

Since a Faraday rotator 403 is a non-reciprocal device, any signal traveling through the isolator in the reverse (isolation) direction will be split on both passes through the birefringent plate 405 such that neither will intercept the input fiber 406.

A second prior-art reflection-type polarization independent optical isolator suitable for use as an optical passive component in an optical amplifier is disclosed in U.S. Pat. No. 5,499,132, incorporated herein by reference, and is shown in FIGS. 5A and 5B. The second prior-art reflection-type polarization independent optical isolator 500 shown in FIGS. 5A and 5B includes at least two optical fibers 501 and 502, an optical fiber array 503 into which the fibers are secured and whose tip end is polished at the angle of approximately 8 degrees, a birefringent crystal 504 for dividing the input light into two linearly polarized lights, a half wave plate 505 for reversibly rotating the direction of polarization of the input light by approximately 45 degrees, a graded index type rod-lens 506 to collimate and focus the light, a magnetooptical crystal 507 and associated magnet 508 for non-reversibly rotating the direction of polarization of light transmitted therethrough by 22.5 degrees counter clockwise on each pass, a reflector 509, and a glass plate 510.

In the second prior-art reflection-type polarization independent optical isolator 500 shown in FIG. 5A, the signal lights output from the first optical fiber 501 are divided by the birefringent crystal 504 into two linearly polarized light rays, which are then collimated by the lens 506. Thereafter, the planes of polarization of the two linearly polarized light rays are rotated by $\pi/8+n\pi/2$ (n=0, 1, . . . ), respectively, in, for example, the left-hand direction by the magnetooptical crystal 507. After reflection by the reflector plate 509, the two linearly polarized light rays each receive a further rotation of $\pi/8+n\pi/2$ (n=0, 1, . . . ) in the same direction by the magnetooptical crystal 507. A further rotation $\pi/4$ in the same direction is caused by the half wave plate 505. Thereafter, a polarized light coupling operation is effected by the birefringent crystal 504 so as to input the light rays into the second optical fiber 502. Thus, the above described arrangement functions as a polarization-independent optical isolator.

Also disclosed in U.S. Pat. No. 5,499,132 are additional embodiments illustrating extended function of the optical isolator disclosed therein so as to provide an integrated set of optical passive components for use in an optical amplifier. An example of such an embodiment is shown in FIG. 5 of U.S. Pat. No. 5,499,132 in which provision is made for injection, in a direction counter to the signal propagation direction, of two 1480 nm laser-diode pump beams into the optical path as well as for detection and monitoring of a portion of the amplified signal. FIG. 5 of the '132 patent is reproduced herein as FIG. 6, for the convenience of the reader.

The above described prior art optical isolators are all of the single-stage type-that is to say that light inputted thereto passes at most one time through the full set of isolation-providing components. Generally, one stage of isolation structure provides an isolation characteristic of about 35 dB. Therefore, the prior art polarization independent optical isolators described above, although useful for many applications, have an insufficient isolation characteristic for applications to the high quality transmission systems or the optical fiber amplifiers.

In U.S. Pat. No. 5,689,360, incorporated herein by reference, a double-stage reflection isolator is disclosed. FIG. 1 of U.S. Pat. No. 5,689,360 discloses a device comprising both first and second optical isolation units and also a reflection unit for coupling the output of the first optical isolation unit to the input of the second optical isolation unit by directing the outputted signal ray from the first optical isolation unit to the second optical isolation unit, with the signal ray received by the first optical isolation unit transmitting in the opposite direction to the outputted signal ray from the second optical isolation unit. FIG. 1 of the '360 patent is reproduced herein as FIG. 7, for the convenience of the reader, using the reference numerals provided in the '360 patent. The operation of each of the single stage isolators disclosed in U.S. Pat. No. 5,689,360 is similar to that disclosed in U.S. Pat. No. 5,499,132 (and is not repeated in detail here) except that the reflector is not incorporated within each isolator. Instead, the reflector element is positioned after the output of the first optical isolator and before the input of the second optical isolator, with respect to the forward light propagation direction, so as to provide optical coupling between the two isolators. The sequential operation of two optical isolators in this fashion provides improved isolator performance with respect to the operation of a single-stage isolator.

SUMMARY OF THE INVENTION

An object of the present invention is to provide a single-stage polarization independent optical isolator with improved isolation characteristics.

Another object of the present invention is to provide a single-stage broadband polarization independent optical isolator with improved performance characteristics.

An additional object of the present invention is to provide a double-stage polarization independent optical isolator with improved isolation characteristics.

A further object of the present invention is to provide a double-stage broadband polarization independent optical isolator with improved isolation characteristics.

Still another object of the present invention is to provide an isolator/monitor/amplifier.

Another object of the present invention is to provide an optical system based upon the isolator/monitor/amplifier of the present invention.

Yet a further object of the present invention is to provide an optical system based upon the double-stage broadband polarization independent optical isolator and the isolator/monitor/amplifier.

Additional objects and advantages of the invention will be set forth in part in the description which follows and, in part, will be obvious from the description, or may be learned by practice of the invention.

The present invention is a polarization independent isolator and an optical system based thereon. The polarization independent isolator of the present invention includes a single stage polarization independent isolator, a single stage broadband polarization independent isolator, a double stage polarization independent isolator, and a double stage broadband independent isolator. The present invention also includes an isolator/monitor/amplifier, and respective optical systems based upon the isolator/monitor/amplifier of the present invention and on the isolator/monitor/amplifier in cascade with the double-stage broadband polarization independent isolator of the present invention.

The single stage polarization independent isolator of the present invention comprises an input fiber; an output fiber; optical elements including a birefringent walk-off plate, a counterclockwise rotating $\lambda/2$ plate provided adjacent thereto, and a Faraday rotator and associated magnets provided adjacent to the birefringent walk-off plate and the counterclockwise rotating $\lambda/2$ plate; a lens; and a mirror. Input light traveling in the forward direction from the input fiber passes through each of the above-mentioned optical elements and enters the output fiber. However, the above-mentioned optical elements prevent input light from the output fiber traveling in the reverse direction from entering the input fiber.

The single stage broadband polarization independent isolator of the present invention comprises an input fiber; an output fiber; optical elements including a birefringent walk-off plate, a counterclockwise rotating $\lambda/2$ plate and a broadband polarization rotation compensator provided adjacent thereto, and a Faraday rotator and associated magnets provided adjacent to the birefringent walk-off plate and the counterclockwise rotating $\lambda/2$ plate and broadband polarization rotation compensator; a lens; and a mirror. Input light of many wavelengths traveling in the forward direction from the input fiber passes through each of the above-mentioned optical elements and enters the output fiber. However, the above-mentioned optical elements prevent input light from the output fiber traveling in the reverse direction from entering the input fiber.

The double stage polarization independent isolator of the present invention comprises an input fiber; an output fiber; optical elements including a birefringent walk-off plate, a counterclockwise rotating $\lambda/2$ plate provided adjacent thereto, a clockwise rotating $\lambda/2$ plate provided adjacent to the birefringent walk-off plate and to the clockwise rotating $\lambda/2$ plate, a Faraday rotator and associated magnets provided adjacent to the birefringent walk-off plate and the counterclockwise rotating $\lambda/2$ plate and the clockwise rotating $\lambda/2$ plate, and a second birefringent walk-off plate; a lens; and a mirror. Input light traveling in the forward direction from the input fiber passes through each of the above-mentioned optical elements and enters the output fiber. However, the above-mentioned optical elements prevent input light from the output fiber traveling in the reverse direction from entering the input fiber.

The double stage broadband polarization independent isolator of the present invention comprises an input fiber; an output fiber; optical elements including a birefringent walk-off plate, a counterclockwise rotating $\lambda/2$ plate and broadband polarization compensator provided adjacent thereto, a clockwise rotating $\lambda/2$ plate and second broadband polarization compensator provided adjacent to the birefringent walk-off plate and to the clockwise rotating $\lambda/2$ plate and broadband polarization compensator, a Faraday rotator and associated magnets provided adjacent to the birefringent walk-off plate and to the broadband polarization compensator and the clockwise rotating $\lambda/2$ plate, and a second birefringent walk-off plate; a lens; and a mirror. Input light traveling in the forward direction from the input fiber passes through each of the above-mentioned optical elements and enters the output fiber. However, the above-mentioned optical elements prevent input light from the output fiber traveling in the reverse direction from entering the input fiber.

The isolator/monitor/amplifier of the present invention is based upon the single stage broadband polarization independent isolator of the present invention, and further includes a laser input and monitor output.

An optical system of the present invention includes two of the isolator/monitor/amplifiers of the present invention coupled to each other in series through an Er-doped fiber or other suitable optical gain element. The two isolator/monitor/amplifiers of the present invention coupled in series replace the optical passive components of a prior art optical system.

In addition, the present invention is a cascaded optical system including a double sided broadband polarization independent optical isolator of the present invention coupled in series to an isolator/monitor/amplifier of the present invention. Input signal light makes two passes through the optical system, being output from the isolator/monitor/amplifier along Er-doped fiber after the first pass therethrough. The Er-doped fiber then carries the input light back to the isolator/monitor/amplifier and the double sided broadband polarization independent isolator for a second pass through the cascaded optical system.

Because of its function described herein, a λ/2 plate is also referred to as a reciprocally rotating optical element.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 2A and 2B are side views of the operation of a prior-art polarization independent optical isolator in both the forward (FIG. 2A) and reverse (FIG. 2B) light propagation directions.

FIG. 3A is a perspective view of a prior-art polarization rotation compensator and FIG. 3B is a side view of the operation of a prior-art polarization independent optical isolator which utilizes the same polarization rotation compensator.

FIGS. 5A and 5B are side views of a second prior-art reflection-type polarization independent optical isolator with delineated light paths in both the forward (FIG. 5A) and reverse (FIG. 5B) propagation directions.

FIGS. 20A and 20B are a pair of schematic side views of the loci of light ray paths during first and second passes through the integrated optical passive component of FIG. 17.

DESCRIPTION OF THE PREFERRED EMBODIMENTS

Figure 1:
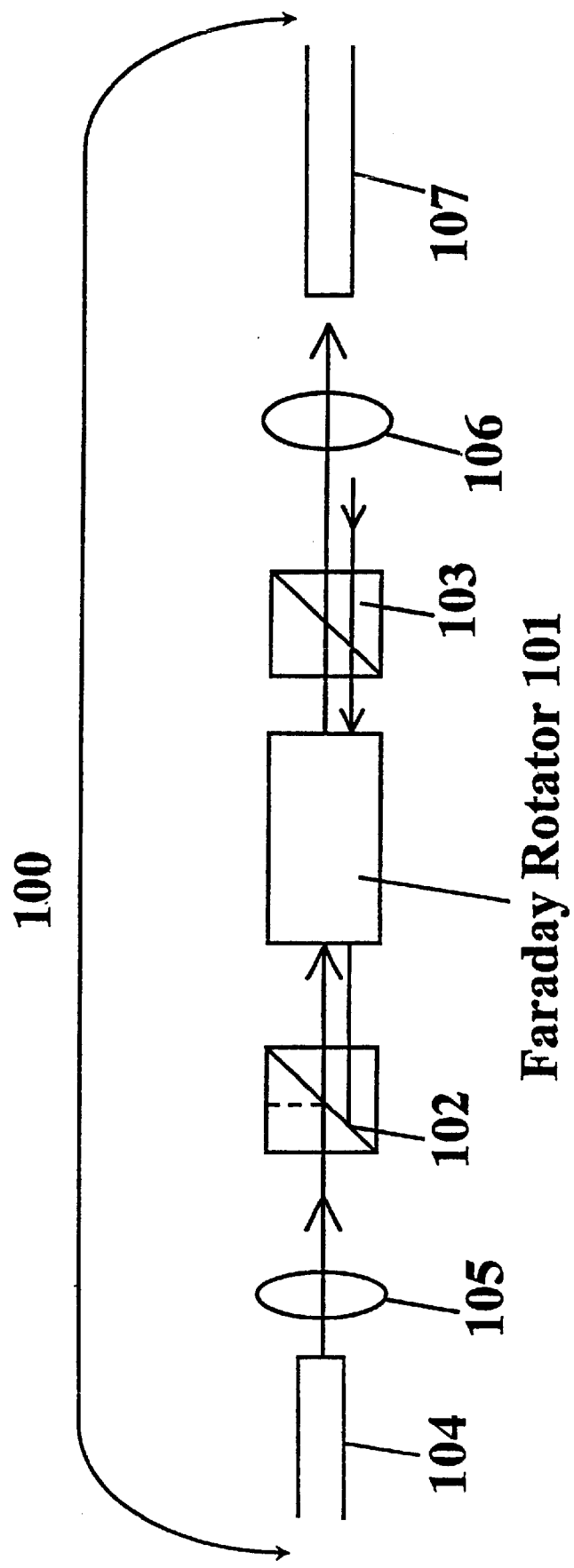
FIG. 1 is a schematic view of a prior-art polarization dependent optical isolator.
Figure 4:
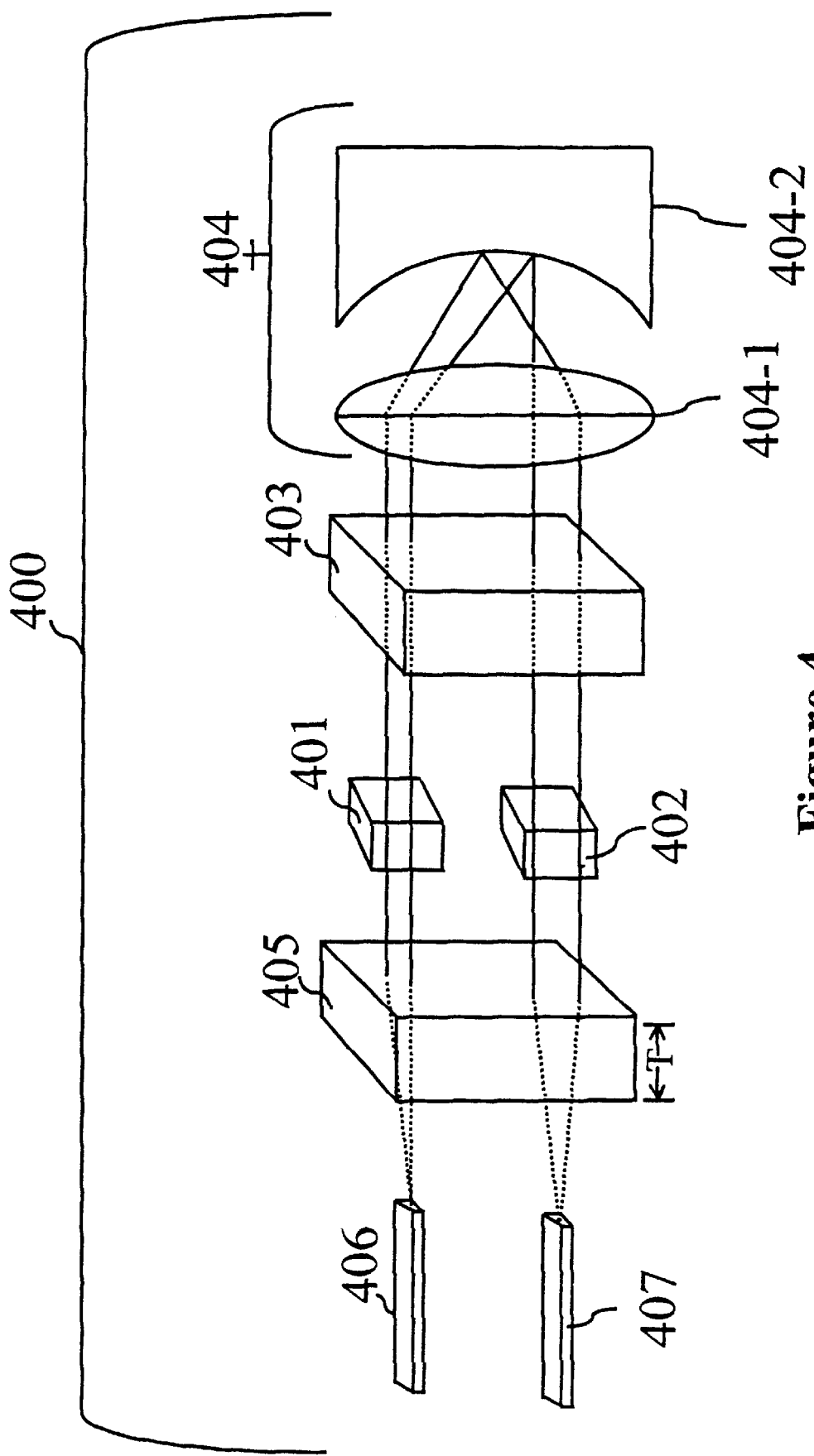
FIG. 4 is a perspective view of a prior-art polarization independent optical isolator of the reflection type.
Figure 6:
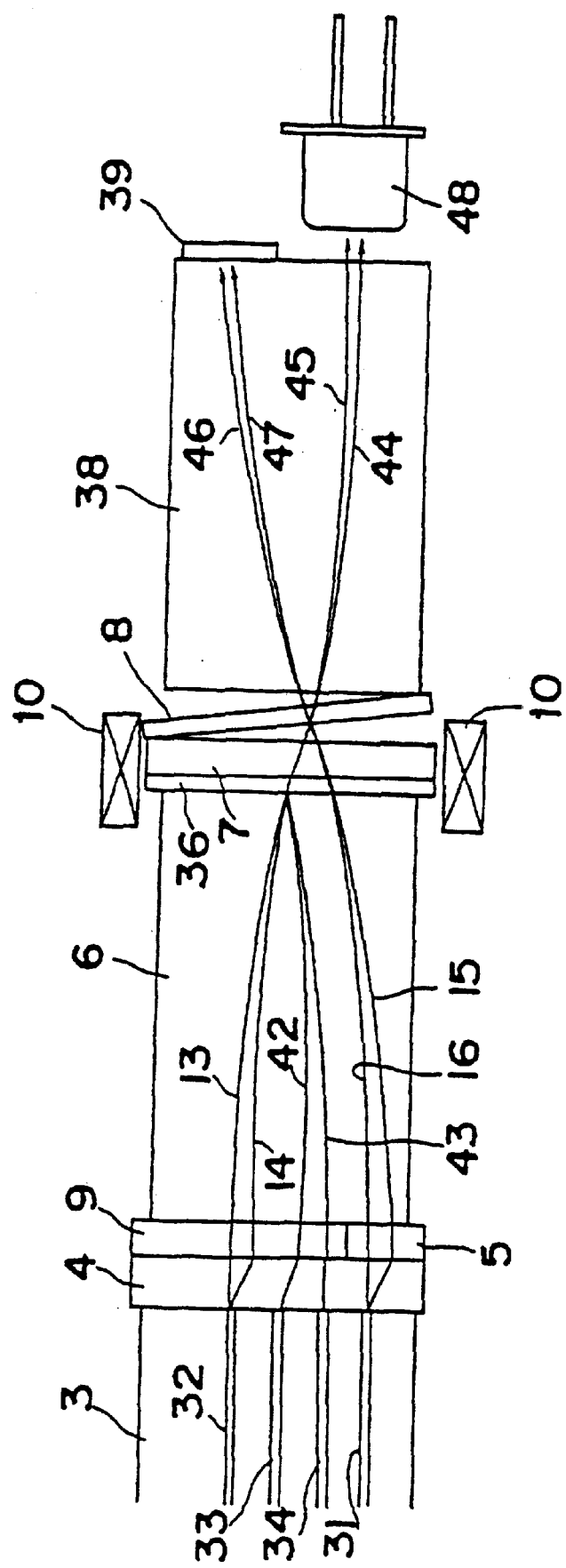
FIG. 6 is a sectional view illustrating the construction of a prior-art optical passive component.
Figure 7:
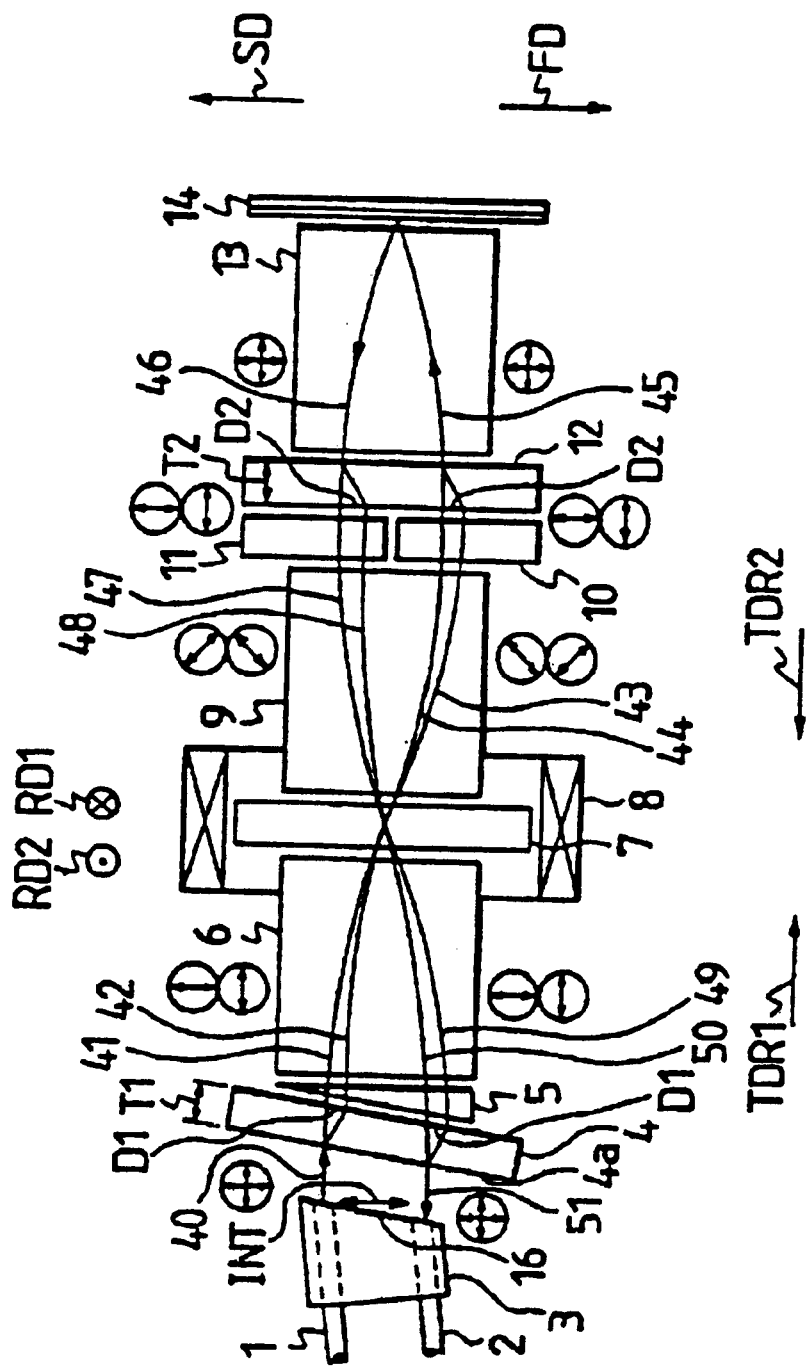
FIG. 7 is a side view of a prior-art double-stage polarization independent optical isolator showing the loci of forward propagating light rays.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 8A:
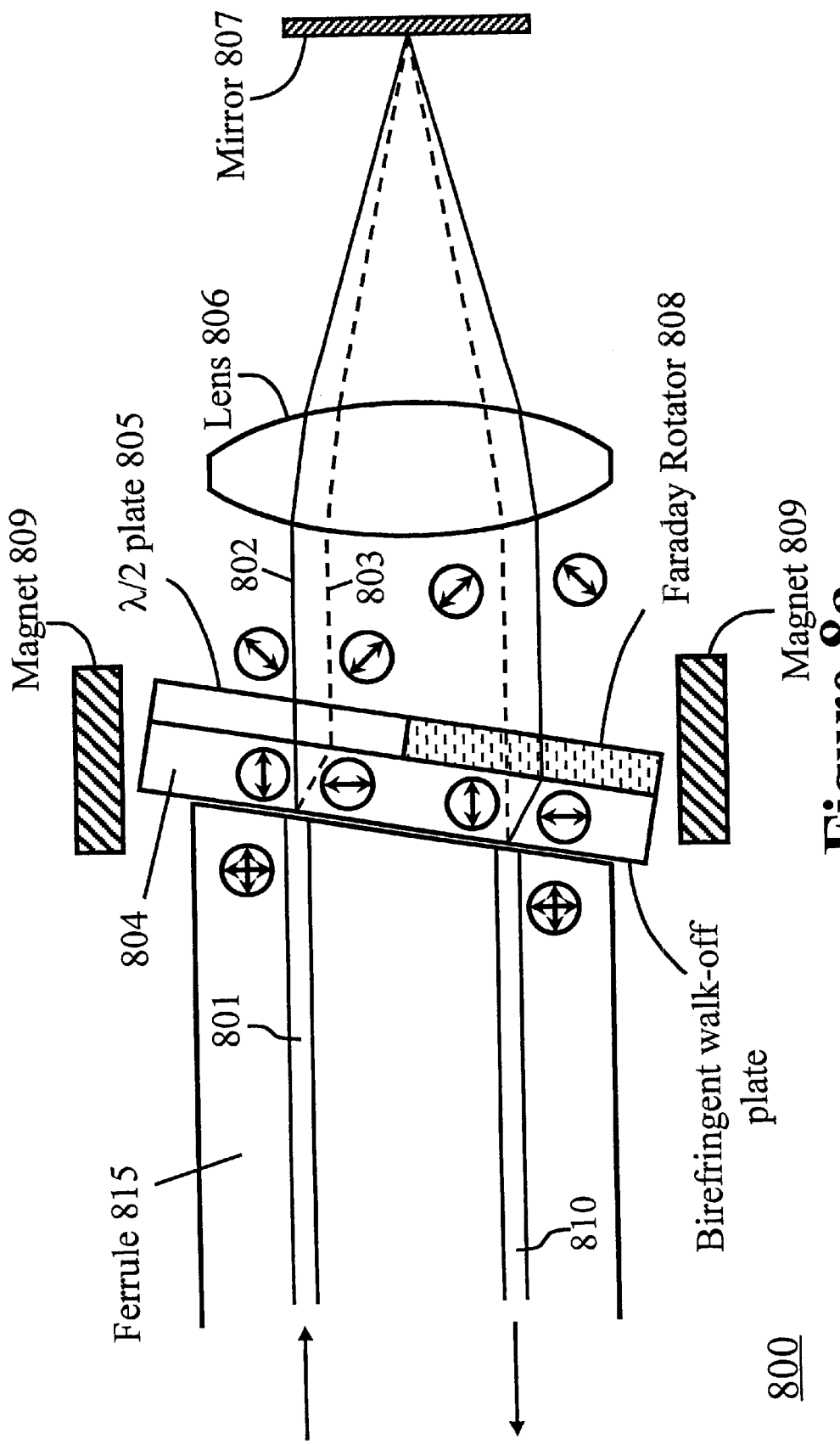
FIGS. 8A and 8B are side views showing the structure and operation of a first embodiment of a single-stage polarization independent optical isolator of the present invention showing, respectively, loci of forward and backward propagating central light rays of two principal polarization states.
Figure 8B:
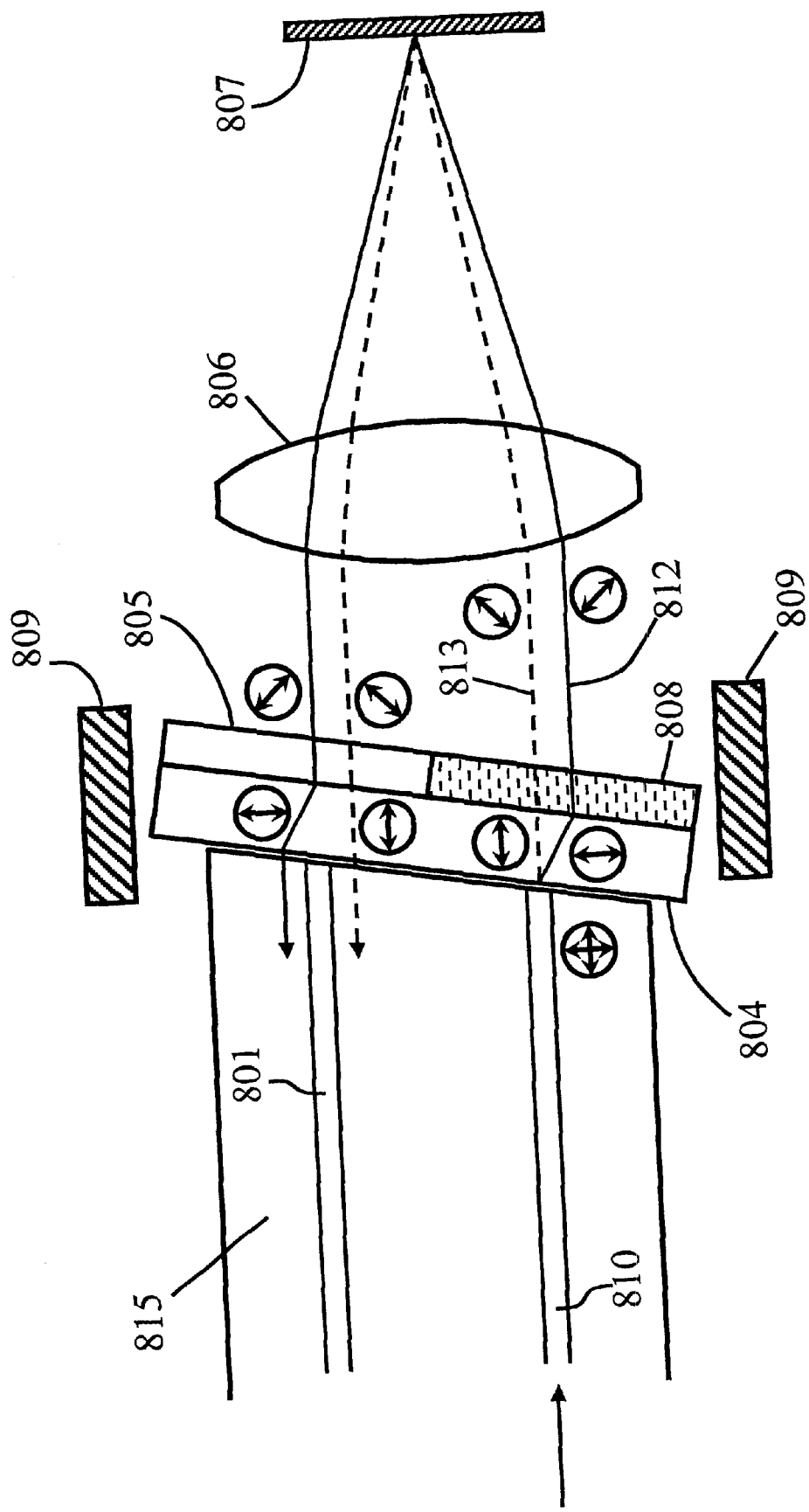

Beginning with FIGS. 8A and 8B, and in all other subsequent figures included herein, solid and/or dashed lines with directional arrows affixed represent signal (light ray) trajectories and circles containing one or two double-headed arrows represent light beam polarization directions of the signals to which they are adjacent. Neither these trajectory indicators nor polarization direction indicators represent actual physical components of the embodiments to which they apply, and are provided as visual aids for the reader. Furthermore, the polarization direction indicators are all drawn and are always drawn as if the respective device were viewed end-on from a fixed reference point at the left side of the respective figure.

The first embodiment of the polarization independent optical isolator of the present invention is illustrated in a side view in FIG. 8A and FIG. 8B. FIG. 8A and FIG. 8B illustrate operation of this first embodiment of the polarization independent optical isolator 800 of the present invention during, respectively, forward and reverse propagation of light therethrough.

Forward signal light propagation through the first embodiment of the present invention is now explained with reference to FIG. 8A. As shown in FIG. 8A, input fiber(s) 801 and output fiber(s) 810 are all contained within and secured to a ferrule 815 capable of containing at least two and up to four parallel optical fibers. The end face of the ferrule 815 together with the fibers contained therein is polished flat and cut at a tapered angle of approximately 8°.

Unpolarized light entering the polarization independent optical isolator 800 of the present invention via the input fiber 801 is first split into sub-signals 802 and 803 by the birefringent walk-off plate 804. The principal optical axes of birefringent walk-off plate 804 are aligned such that sub-signal 802 propagates through as an ordinary ray (o-ray) and is not deflected while sub-signal 803 propagates through as an extraordinary ray (e-ray) and is deflected by the well-known birefringence walk-off effect, as shown in FIG. 8A. In FIG. 8A and in all subsequent figures, o-rays and e-rays are drawn as horizontally and vertically polarized, respectively.

The amount of walk-off of a signal entering the birefringent walk-off plate 804 which is introduced by the birefringent walk-off plate 804 is dependent upon the thickness of the plate 804 in the direction of the signal pathway. More particularly, the birefringent walk-off plate 804 introduces approximately 20 $\mu$m of walk-off for each 200 $\mu$m of thickness of the birefringent walk-off plate 804.

After passing through birefringent walk-off plate 804, each of the sub-signals 802 and 803 enters the $\lambda/2$ (half-wave) plate 805 which reciprocally rotates the polarization of each of the sub-signals 802 and 803 by 45° in a counterclockwise direction. Both sub-signals 802 and 803 are collimated and directed by lens 806 onto mirror 807, which reflects the subsignals 802 and 803 back to and through the lens 806. Lens 806 then directs the reflected light through the Faraday rotator 808 which, in response to a magnetic field applied by magnets 809, non-reciprocally rotates the polarization of both sub-signals 802 and 803 by 45° in a counterclockwise direction. After passing through the Faraday rotator 808, both sub-signals 802 and 803 re-enter the birefringent walk-off plate 804 such that sub-signal 802 is vertically polarized and sub-signal 803 is horizontally polarized. Sub-signal 802 therefore re-enters the birefringent walk-off plate 804 as an e-ray and is deflected by an amount equal to and opposite from the original deflection of sub-signal 803. Furthermore, sub-signal 803 reenters element 804 as an o-ray and is not deflected. Because of these switches in character with respect to the two passes through birefringent walk-off plate 804, from o-ray to e-ray for sub-signal 802 and from e-ray to o-ray for sub-signal 803, their respective deflections in the birefringent walk-off element 804 are canceled and these two sub-signals thus recombine (after passage through birefringent walk-off plate 804) and enter the output fiber 810 as a single combined signal.

Elements 804, 805, and 808, in combination as shown in FIGS. 8A and 8B are referred to collectively as a single stage polarization independent optical element.

Polarization independent optical isolators generally contain one reciprocal (or reversible) polarization rotator (or "rotator", for short) and one non-reciprocal (or non-reversible) polarization rotator. This and subsequent embodiments of the present invention described herein each include at least one of each of these two types of rotators. In the polarization independent optical isolator 800 of the present invention shown in FIGS. 8A and 8B, the reciprocal rotator is the $\lambda/2$ (half-wave) plate 805 and the non-reciprocal rotator is the Faraday rotator 808 together with the associated magnets 809. Both such optical elements (the reciprocal and the non-reciprocal rotators) are used such that the direction of the plane of linearly polarized light that passes through them is rotated after such passage. When so used, reciprocal rotators have the property such that, given the polarization direction of a traversing light beam both to one side and to the other side of the reciprocal rotator, it is impossible to determine the propagation direction of the light beam traveling therethrough. Equivalently stated, for polarization plane rotation by a reciprocal rotator, the direction of rotation about the axis of light propagation, either clockwise (CW) or counter-clockwise (CCW), is always the same when viewed facing the reciprocal rotator towards the side at which the linearly polarized light beam enters the element.

Conversely, non-reciprocal (non-reversible) rotators have the property such that the direction of polarization plane rotation about the axis of light propagation, either clockwise (CW) or counter-clockwise (CCW), is always the same when viewed facing the non-reciprocal rotator from a fixed reference point in a fixed direction, regardless of the propagation direction of the light ray through the element.

Keeping these points in mind, FIG. 8B illustrates the behavior of light rays propagating in the reverse direction through the polarization independent optical isolator 800 of the present invention. Light entering the polarization independent optical isolator 800 of the present invention via output fiber 810 is first split by the birefringent walk-off plate 804 into reverse-propagating sub-signals 812 and 813. In this case, sub-signal 812 passes through birefringent walk-off plate 804 as a vertically polarized e-ray and is deflected, whereas sub-signal 813 passes through as an o-ray, which is not deflected. Both sub-signals 812 and 813 then pass through the Faraday rotator 808 which non-reciprocally rotates the polarization planes of both by 45° in the counterclockwise direction. Sub-signals 812 and 813 are then collimated and directed by lens 806 onto mirror 807, which reflects them back to and through lens 806. Lens 806 then directs the reflected signals 812 and 813 to the $\lambda/2$ plate 805 which rotates the plane of polarization of both of them by 45° counterclockwise.

Because λ/2 plate 805 is a reciprocal rotator, the counterclockwise rotation of each sub-signal 812 and 813 is as viewed facing toward the side at which the sub-signal entry to the λ/2 plate 805 occurs. However, as viewed end-on from a fixed reference point at the left side of FIG. 8B, the rotation of the sub-signal is in a clockwise direction. After the rotation by λ/2 plate 805, both sub-signals 812 and 813 re-enter the birefringent walk-off plate 804 such that sub-signal 812 is vertically polarized and sub-signal 813 is horizontally polarized. The horizontally polarized sub-signal 813 passes through element 804 as an o-ray and is not deflected; conversely the vertically polarized sub-signal 812 passes through element 804 as a vertically polarized e-ray and is deflected for a second time by an amount equal and opposite to its original deflection after exiting fiber 810. Because of these signal trajectories, the sub-signals 812 and 813 fail to re-combine and both fail to enter the input fiber 801 in the reverse direction. Thus, the function of the single stage optical isolator 800 of the present invention as a "one-way gate" is realized.

Figure 9:
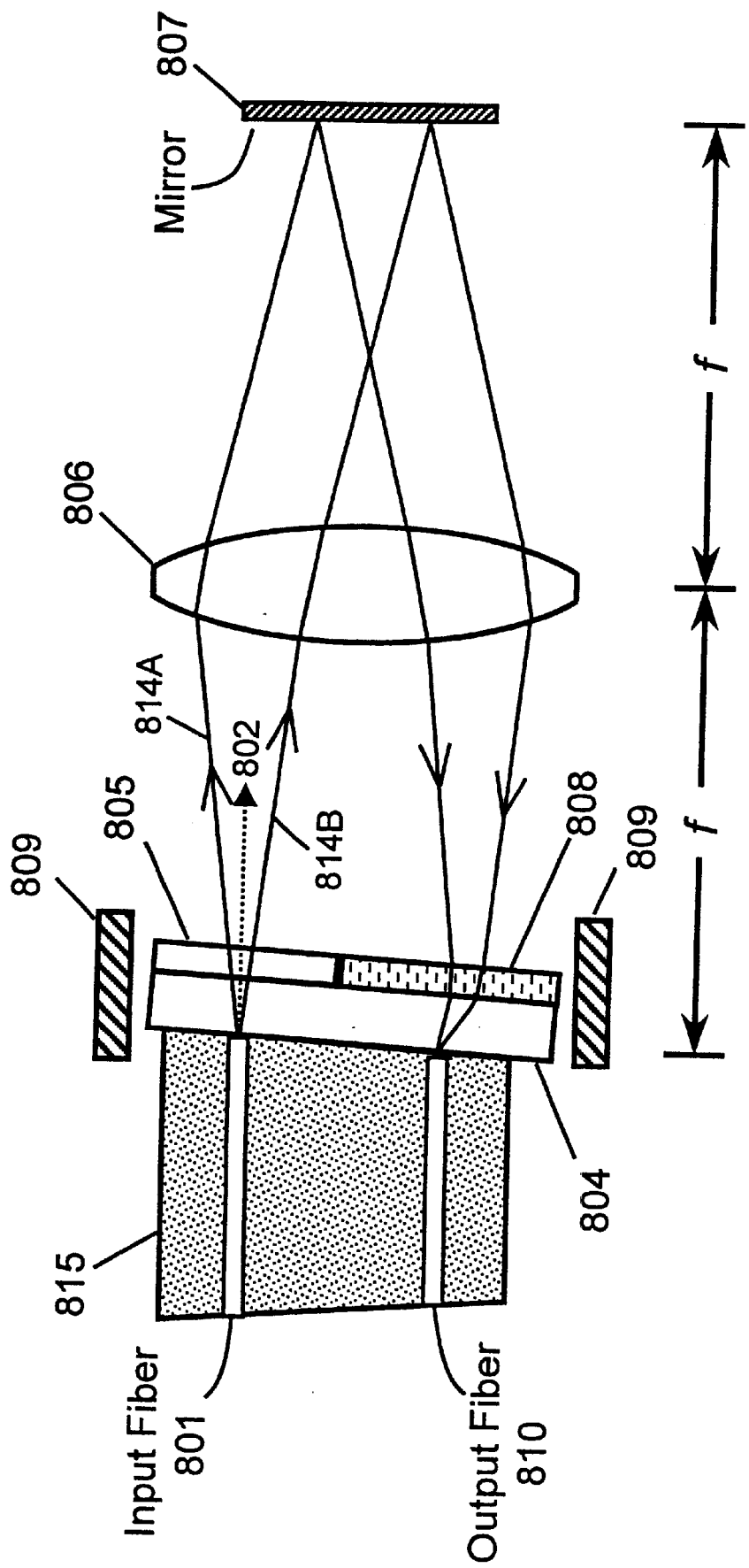
FIG. 9 is a side view showing the structure and operation of a first embodiment of a single-stage polarization independent optical isolator of the present invention showing loci of the full sheath of forward propagating light rays of one of the two principal polarization states.

Unless otherwise stated, in FIG. 8A and FIG. 8B as well as in all subsequent drawings herein, only the paths of representative centrally located rays of each polarization state are depicted. For instance, ray paths 802 and 803 (FIG. 8A) and 812 and 813 (FIG. 8B) correspond to such representative central rays. Rays such as those depicted by reference numerals 802, 803, 812, and 813 are each one of a plurality of rays of each sub-signal, as shown in FIG. 9 for the sub-signal corresponding to ray path 802. In FIG. 9, in addition to ray path 802, are also shown the representative bounding light ray paths 814A and 814B. The bounding ray paths 814A and 814B represent the loci of two rays that fall on the boundary of the full assemblage or plurality of rays in one of two mutually orthogonal polarization states which emanate from fiber 801 (or from fiber 810). Such boundary exists because, in three dimensions, the light emanating from fiber 801 (or 810) comprises a diverging (or converging) cone between the fiber end and lens 806 and comprises a cylinder between the lens 806 and mirror 807. Reference numeral 802 represents the unique central light ray at the center of the full assemblage of rays in one polarization state whose boundary is represented by reference numerals 814A and 814B. For simplicity, rays of the complementary polarization state, corresponding to ray path 803 (FIG. 8A) are not shown in FIG. 9.

Also as shown in FIG. 9, the focal length f from the lens 806 to the birefringent walk-off plate 804 is the same as the focal length f from the lens 806 to the mirror 807. By this means, lens 806 collimates light inputted from either of the fibers 801 or 810 and focuses output light onto either of these fibers. One of ordinary skill in the art will recognize that modifications may be made by which such collimating and/or focusing is performed by one or more lenses which are not necessarily disposed between these fibers and the mirror 807. Any and all such modifications are within the scope of the present invention.

Since optical isolators typically utilize Faraday rotators and since the angular polarization rotation of Faraday rotators typically depends on wavelength, the wavelength region that gives the 45-degree rotation of the input light signal is very narrow. This makes it possible to maintain a high isolation of the signal only in a very limited wavelength region, unless deviation from 45-degree rotation is compensated for. More particularly, optical isolators of the prior art generally work well within one narrow band of wavelength due to the above-mentioned 45° rotation mentioned herein above, and other wavelengths above and below may provide or receive leakage.

Figure 10:
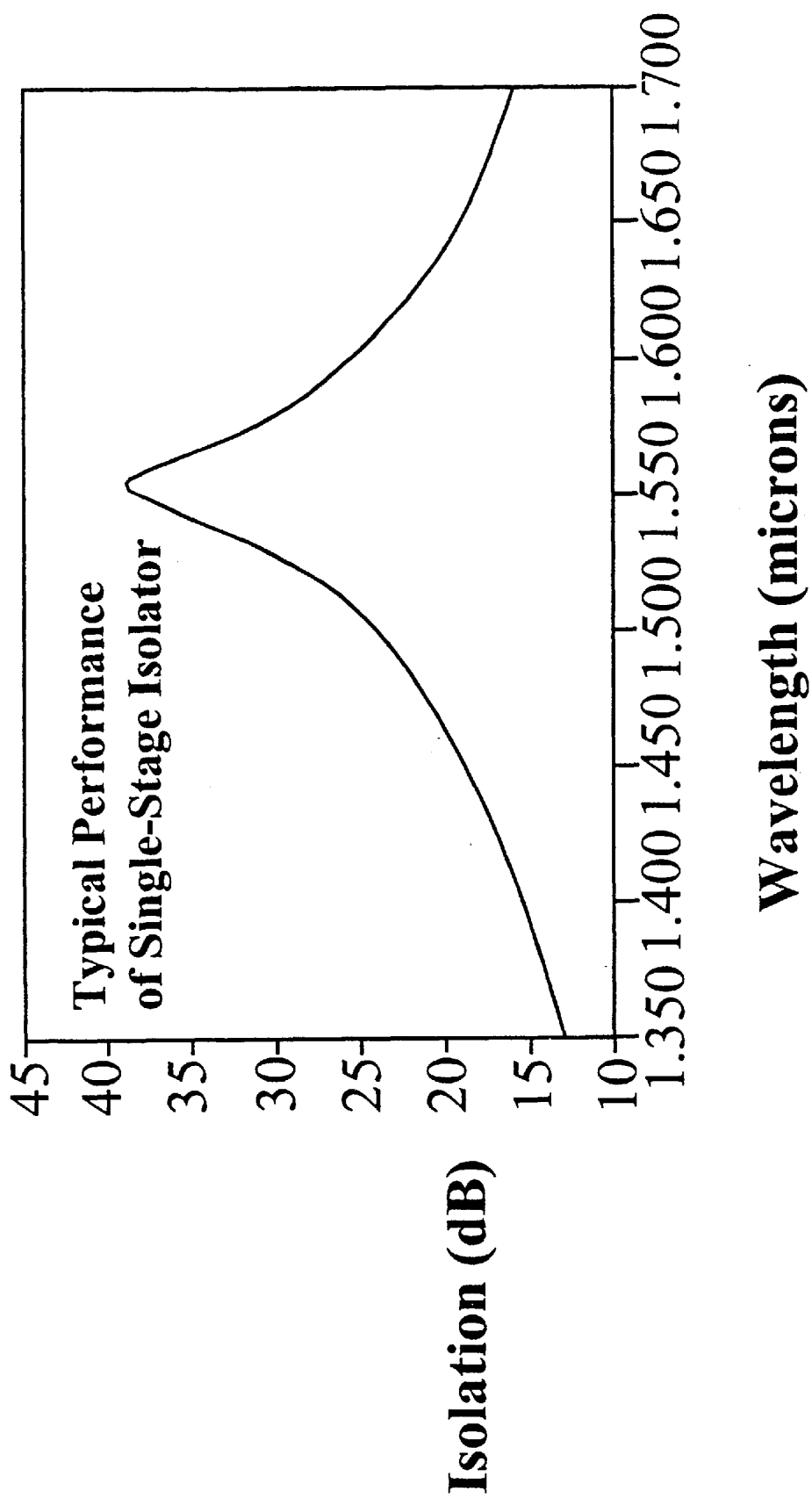
FIG. 10 is a graph showing an approximation to the expected wavelength variation of the performance of a typical single stage optical isolator.

For instance, FIG. 10 shows a graph of the approximate isolation performance, plotted against wavelength, which can be typically expected for a single-stage optical isolator which is not compensated for wavelength. The use of a polarization rotation compensator, similar to that disclosed in U.S. Pat. No. 4,712,880, can significantly broaden the wavelength region of maximum isolation.

Figure 11:
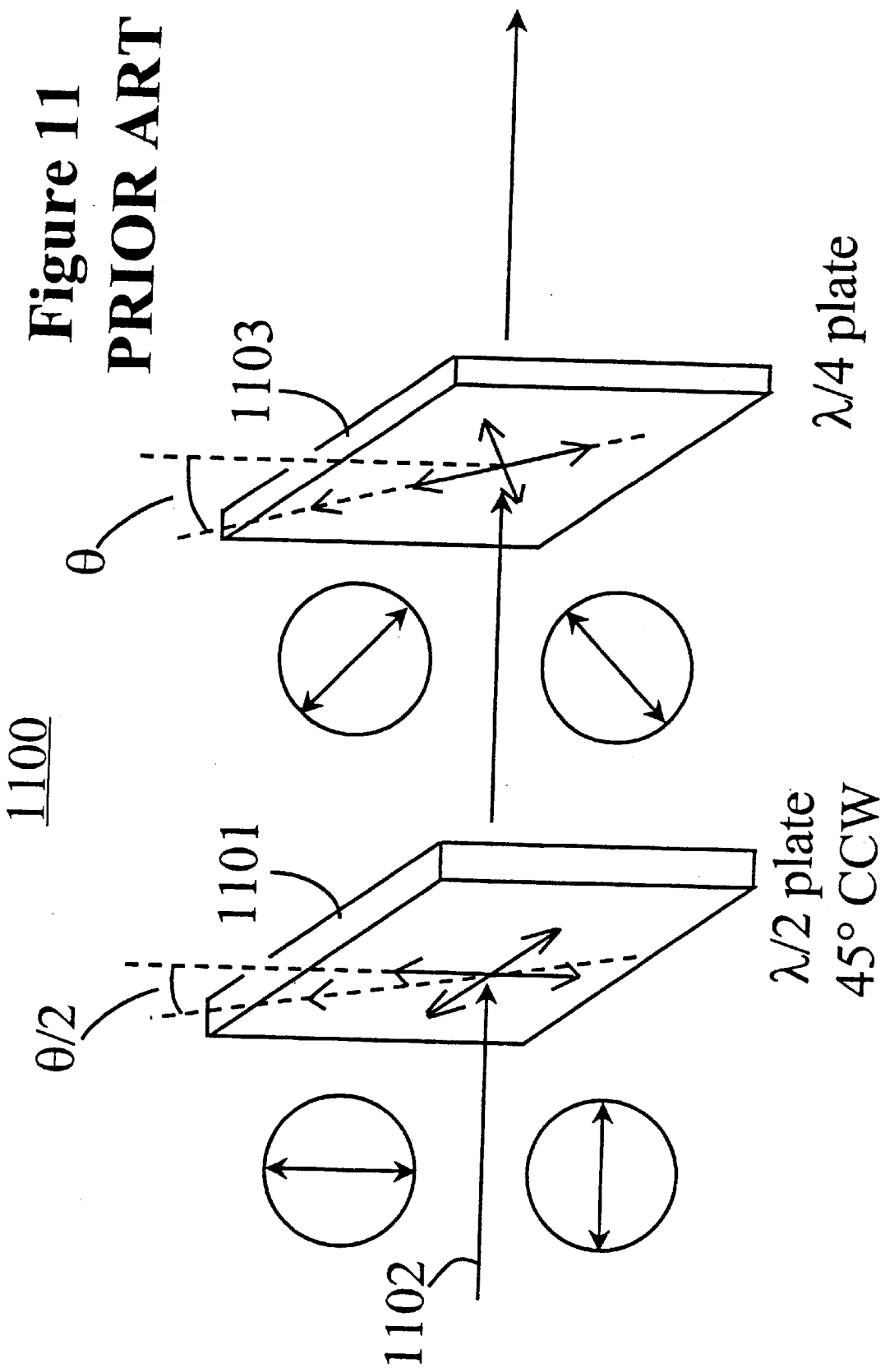
FIG. 11 is a perspective view of a polarization rotation compensator for use in conjunction with an embodiment of a polarization independent optical isolator of the present invention.

FIG. 11 illustrates a polarization rotation compensator 1100 suitable for use in a second embodiment of the present invention, explained herein below with reference to FIG. 12. The polarization rotation compensator 1100 includes a λ/2 (half-wave) plate 1101 whose principal axis is inclined at an angle of λ/2° with respect to the plane of polarization of the incident light 1102 and a quarter-wave plate 1103 whose principal axis is inclined at an angle of θ° with respect to the plane of polarization of the incident light 1102, with the half-wave plate and the quarter-wave plate disposed in this order with respect to the forward light propagation direction.

The polarization rotation compensator 1100 introduces a range of polarization angles which vary based on wavelength based upon the adjustment of plates 1101 and 1103. The range of polarization angles versus wavelength of the rotation compensator 1100 can be adjusted to be opposite to that of another element within an optical system to counter balance or compensate for the aberrations introduced by the other element, as is well-known in the art and disclosed in U.S. Pat. No. 4,712,880.

If the polarization rotation compensator 1100 is included in the polarization independent isolator 800 of the first embodiment of the present invention, in addition to and adjacent to, the half-wave plate 805, then the resulting apparatus is a second embodiment of the present invention, referred to as a single stage broadband polarization independent isolator 1200 and disclosed herein below beginning with reference to FIG. 12. Thus, polarization rotation compensation functionality is added to isolator 800 through the insertion, immediately after λ/2 plate 805 with respect to forward light propagation, of a new polarization rotation compensator of the type shown in FIG. 11.

Figure 12:
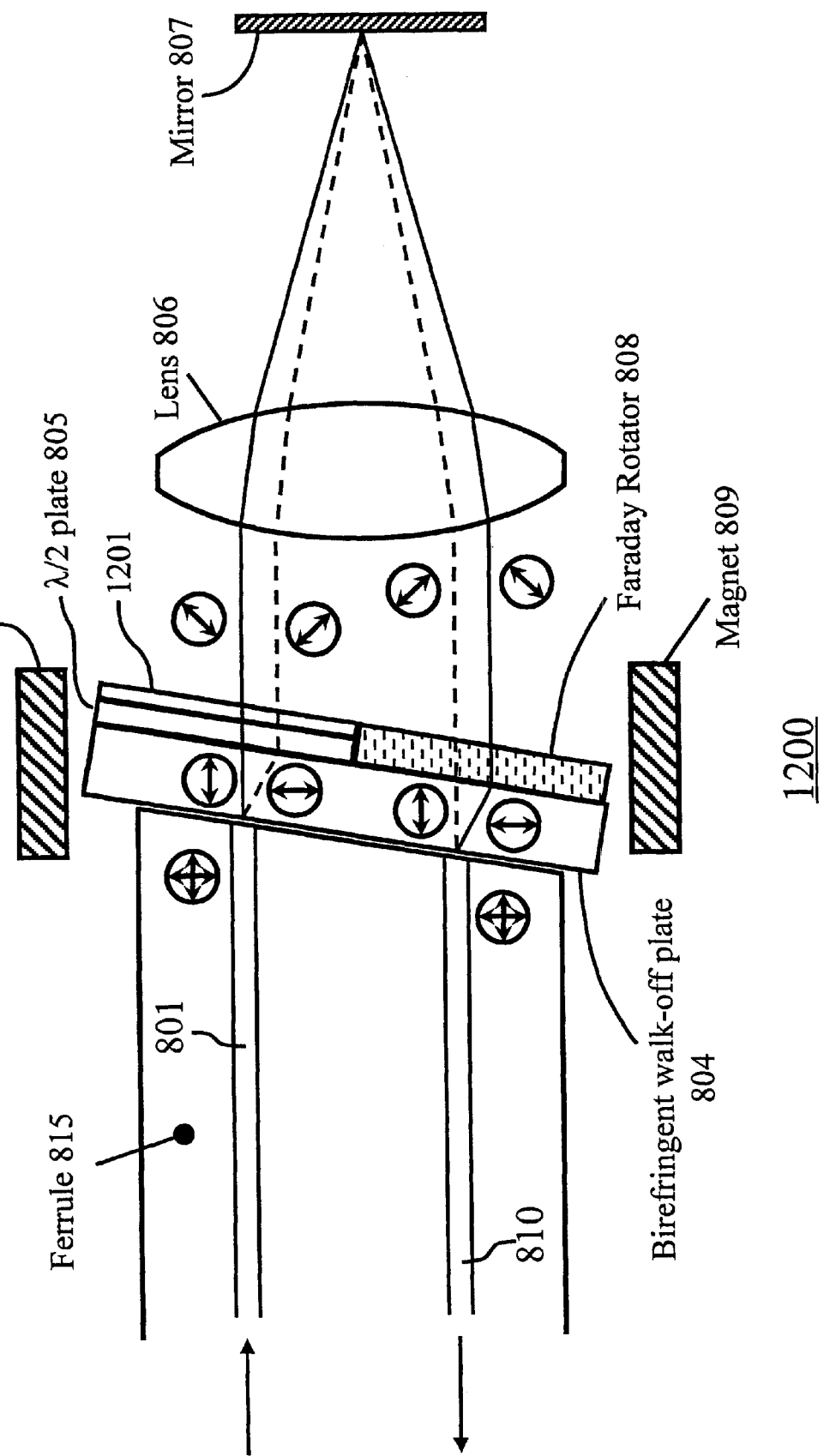
FIG. 12 is a side view showing the structure and operation of a second embodiment of a single-stage polarization independent optical isolator of the present invention having polarization rotation compensation with the loci of forward propagating central light rays of two principal polarization states denoted.

A second embodiment of the polarization independent optical isolator of the present invention, referred to as a single stage broadband polarization independent optical isolator, is shown in FIG. 12.

The single stage broadband polarization independent optical isolator 1200 shown in FIG. 12 includes a quarter-wave element (λ/4 plate 1103 shown in FIG. 11), along with a half-wave element (λ/2 plate 1101 shown in FIG. 11), collectively referred to as the polarization rotation compensator 1100 shown in FIG. 11 and denoted by reference numeral 1201 in FIG. 12, along with a λ/2-wave plate 805 shown in FIGS. 8A and 8B. The isolator 1200 shown in FIG. 12 is otherwise identical in construction to the isolator 800 shown in FIGS. 8A and 8B except for the addition of polarization rotation compensator 1100. The addition of the polarization rotation compensator 1100 to the isolator 800 of the present invention shown in FIGS. 8A and 8B provides an isolator 1200 with improved performance.

The isolator 1200 provides acceptable isolation performance over a broader wavelength range than is realized for isolator 800. In all other aspects, the operation of isolator 1200 is similar to that already described for isolator 800 and is not repeated in detail here. The angle which the λ/2 plate of polarization rotation compensator 1201 makes with a vertical axis of the input fiber 801 must be tuned through a compensator for one specific device, to provide specific rotation of input light, such as 45° rotation.

The broadband polarization optical compensator 1201 of the single stage broadband polarization independent optical isolator 1200 of the present invention shown in FIG. 12 provides even greater effective isolation of input light, allowing more channels to be included in an optical fiber of a transmission band, with reduced leakage between channels, and improved performance over the entire bandwidth of input light.

Elements 804, 805, 808, and 1201, in combination as shown in FIG. 12 are referred to collectively as a single stage broadband polarization independent optical element.

Figure 13A:
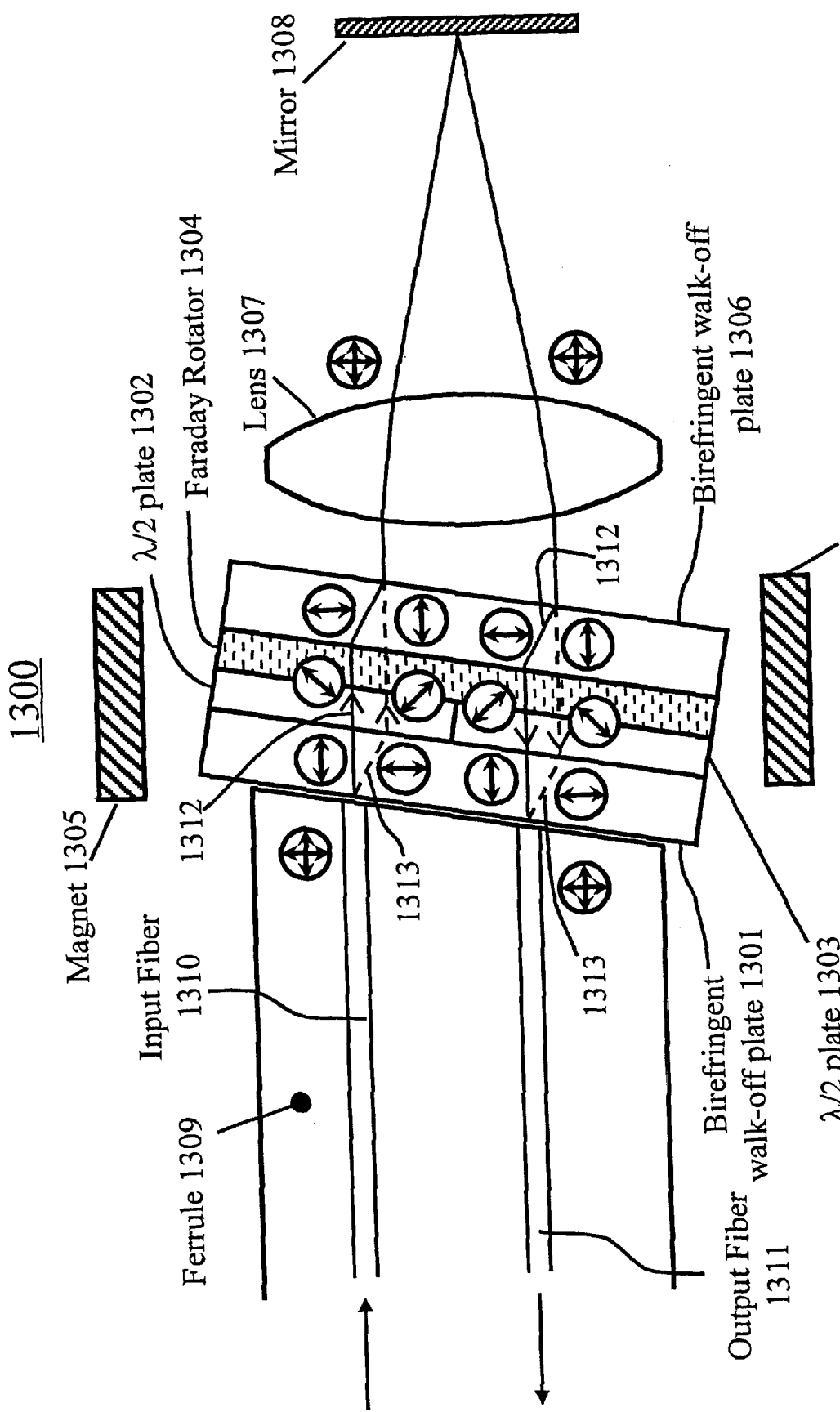
FIGS. 13A and 13B are side views showing the structure and operation of a first embodiment of a double-stage polarization independent optical isolator of the present invention showing, respectively, loci of forward and backward propagating central light rays of two principal polarization states.
Figure 13B:
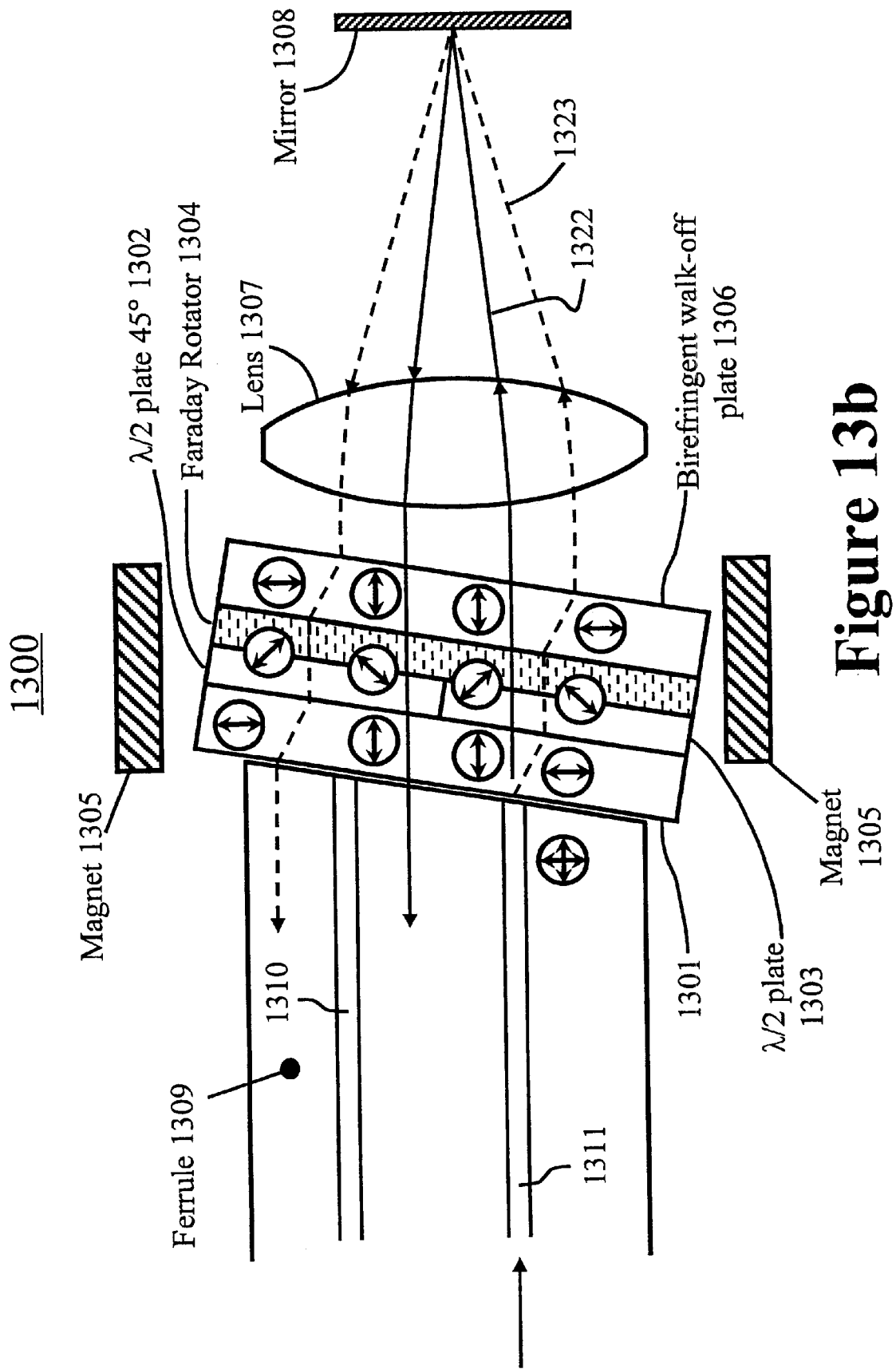

The two already-described embodiments, isolator 800 and isolator 1200, of the polarization independent optical isolator of the present invention are both isolators of the single-stage type. A third embodiment of the present invention, comprising a double-stage polarization independent optical isolator, is shown in FIG. 13A and FIG. 13B. The double-stage polarization independent optical isolator 1300 of the present invention shown in FIGS. 13A and 13B provides even greater isolation of signals than does the isolator 800 of the first embodiment of the present invention because the number of optical isolation elements that a signal travels through from input to output is effectively doubled over that of the isolator 800 of the first embodiment. Also, as discussed further below, the double stage polarization independent optical isolator 1300 has the advantage of being free from polarization mode dispersion (PMD) that, in some cases, may be problematic for isolator 800 or isolator 1200.

Optical isolators of the prior art generally include leakage of light backward through the system. The leaked light, which can be damaging to the transmitted optical light, is generally produced by reflections off of components within the optical transmission system and is compensated for in the prior art by placing two isolators of the prior art in series with each other.

In FIG. 13A and FIG. 13B, the double-stage polarization independent optical isolator 1300 of the present invention comprises a birefringent walk-off plate 1301, a first $\lambda/2$ (half-wave) plate 1302 with its principal optical axes oriented such that linearly polarized light propagating therethrough has the orientation of its polarization plane reversibly rotated by 45° counterclockwise about the propagation axis, a second $\lambda/2$ (half-wave) plate 1303 with its principal optical axes oriented such that linearly polarized light propagating therethrough has the orientation of its polarization plane reversibly rotated by 45° clockwise about the propagation axis, a Faraday rotation crystal 1304 and associated magnets 1305 which provides a non-reversible polarization plane rotation of 45° counterclockwise to light propagating therethrough, a second birefringent plate 1306 having properties, orientation, and dimensions identical to those of element 1301, a focusing/recollimation lens or lens assembly 1307 and a mirror 1308. Also provided in double-stage isolator 1300 is a fiber holder or ferrule 1309 within which is provided at least one input optical fiber 1310 and at least one output optical fiber 1311.

The operation of the isolator 1300 with signal light propagating in its normal forward direction is illustrated in FIG. 13A whereas the operation of isolator 1300 with light propagating in the undesired reverse direction is illustrated in FIG. 13B. Also indicated in both FIG. 13A and FIG. 13B are the locations and polarization states of representative signal and sub-signal light rays propagating in both the forward (FIG. 13A) and reverse (FIG. 13B) directions.

The forward propagation of signal light through double-stage isolator 1300 will now be described with reference to FIG. 13A. Unpolarized light entering the polarization independent optical isolator 1300 via the input fiber 1310 is first split into polarized sub-signals, 1312 and 1313, by the birefringent walk-off plate 1301. The principal optical axes of birefringent walk-off plate 1301 are aligned such that sub-signal 1312 propagates through as an ordinary ray (o-ray) and is not deflected while sub-signal 1313 propagates through as an extraordinary ray (e-ray ) and is deflected by the well-known birefringence walk-off effect.

In FIG. 13A and FIG. 13B, o-rays and e-rays are drawn as horizontally and vertically polarized, respectively, although this specific orientation is not required. After passing through element 1301, each of the sub-signals 1312 and 1313 enters the first $\lambda/2$ (half-wave) plate 1302 that reciprocally rotates the polarization of each of the sub-signals 1312 and 1313 by 45° in a counterclockwise direction. Both sub-signals 1312 and 1313 then pass through the Faraday rotator 1304 which, in response to a magnetic field applied by magnets 1305, non-reciprocally rotates the polarization of both sub-signals 1312 and 1313 by 45° in a counterclockwise direction. After passing through the Faraday rotator 1304, both sub-signals 1312 and 1313 enter the second birefringent walk-off plate 1306 such that sub-signal 1312 is vertically polarized and sub-signal 1313 is horizontally polarized. Since the thickness, composition, and orientation of birefringent walk-off plate 1306 are identical to the respective properties of birefringent walk-off plate 1301, the sub-signal 1312 propagates through birefringent walk-off plate 1306 as an e-ray and is deflected by an amount equal to the original deflection of sub-signal 1313 in element 1301. Furthermore, sub-signal 1313 propagates through birefringent walk-off plate 1306 as an o-ray and is not deflected.

Because of these switches in character with respect to the travel through the two birefringent plates 1301 and 1306, from o-ray to e-ray for sub-signal 1312 and from e-ray to o-ray for sub-signal 1313, their relative deflections in the birefringent walk-off elements 1301 and 1306 are canceled and these two sub-signals thus recombine so as to follow identical paths towards lens 1307. The passage of sub-signals 1312 and 1313 through birefringent plate 1301, half-wave plate 1302, Faraday rotator 1304 and birefringent plate 1306 in this order comprises a first stage of optical isolation.

The lens 1307 intercepts both co-propagating sub-signals 1312 and 1313 after their emergence from second birefringent plate 1306 and collimates and directs both of these sub-signals onto mirror 1308. The mirror 1308 reflects both sub-signals 1312 back towards and through lens 1307 which then directs both sub-signals back towards the second birefringent walk-off plate 1306. Upon entering second birefringent walk-off plate 1306 for a second time, the paths of sub-signals 1312 and 1313 are re-separated. The vertically polarized sub-signal 1312 once again propagates through element 1306 as an e-ray and is deflected by an amount equal and opposite to its deflection during its first pass through element 1306. The horizontally polarized sub-signal 1313 once again propagates through element 1306 as an o-ray and is not deflected. Thus, after passing through birefringent plate 1306 for a second time, the relative physical separation of sub-signals 1312 and 1313 is identical to what it was just prior to entering element 1306 for the first time (FIG. 13A). After passing through birefringent plate 1306 for the second time, sub-signals 1312 and 1313 make a second pass through Faraday rotator 1304 which non-reversibly rotates the polarization planes of both of these sub-signals by 45° CCW (counterclockwise).

After passing through Faraday rotator 1304, sub-signals 1312 and 1313 then pass through the second half-wave plate 1303. The half-wave plate 1303 reversibly imposes a 45° CW (clockwise) rotation about the propagation axis upon the polarization planes of both sub-signals 1312 and 1313. Because half-wave plate 1303 is a reciprocal rotator, this polarization plane rotation is in the CCW direction as viewed end-on from a fixed reference point at the left side of the diagram. The two sub-signals 1312 and 1313 thus pass through birefringent plate 1301 for a second time with horizontal and vertical polarization plane orientations, respectively. Because of these polarization plane orientations during their respective second passes through birefringent plate 1301, sub-signal 1312 propagates through plate 1301 as an o-ray and is not deflected whereas sub-signal 1313 passes through plate 1301 as an e-ray and is deflected. This deflection of sub-signal 1313 during its second pass through element 1301 is identical to the deflection of sub-signal 1312 during its second passage through element 1306. Because of these switches in character with respect to the second passage through the two birefringent plates 1301 and 1306, from e-ray to o-ray for sub-signal 1312 and from o-ray to e-ray for sub-signal 1313, their relative deflections in the birefringent walk-off elements 1301 and 1306 are canceled and these two sub-signals thus recombine so as to enter the output fiber 1311 as a single combined signal. The passage of sub-signals 1312 and 1313 through birefringent plate 1306, Faraday rotator 1304, half-wave plate 1303, and birefringent plate 1301 in this order comprises a second stage of optical isolation.

The reverse propagation of signal light through double-stage isolator 1300 will now be described with reference to FIG. 13B. Unpolarized light entering the double-stage polarization independent optical isolator 1300 via the output fiber 1311 is first split into polarized sub-signals, 1322 and 1323, by the birefringent walk-off plate 1301. The principal optical axes of birefringent walk-off plate 1301 are aligned such that sub-signal 1322 propagates therethrough as a horizontally polarized o-ray and is not deflected while sub-signal 1323 propagates therethrough as a vertically polarized e-ray and is deflected by the well-known birefringence walk-off effect. After passing through birefringent plate 1301, both sub-signals 1322 and 1323 enter and pass through half-wave plate 1303 that reversibly imposes a 45° CW rotation on both their polarization plane orientations about the axis of propagation. After passing through half-wave plate 1303, both sub-signals 1322 and 1323 then enter and pass through Faraday rotator 1304 that non-reversibly imposes a 45° CCW rotation on both of their polarization plane orientations about the axis of propagation. After passing through Faraday rotator 1304, both sub-signals 1322 and 1323 then enter and pass through the second birefringent plate 1306.

Upon passing through birefringent plate 1306, sub-signal 1322 is horizontally polarized and thus propagates through element 1306 as an o-ray that is not deflected. Also upon passing through birefringent plate 1306, sub-signal 1323 is vertically polarized and thus propagates through element 1306 as an e-ray that is deflected for a second time by an amount and in a direction similar to the amount and direction of its deflection upon passage through element 1301. The two sub-signals 1322 and 1323 therefore do not recombine after passage through birefringent plate 1306 and continue on towards lens 1307 along separate paths.

Lens 1307 intercepts both reverse propagating sub-signals 1322 and 1323 and collimates and directs them onto mirror 1308 which reflects them back to and through lens 1307 for a second time. Lens 1307 then directs sub-signals 1322 and 1323 towards birefringent plate 1306 for a second time. Upon entering birefringent plate 1306 for the second time, sub-signal 1322 and sub-signal 1323 maintain the same horizontal polarization plane orientation and vertical polarization plane orientation, respectively, with which they emerged after their first passage through plate 1306. Therefore, sub-signal 1322 once again propagates through birefringent plate 1306 as an o-ray that is not deflected and sub-signal 1323 once again propagates through birefringent plate 1306 as an e-ray that is deflected. The deflection of sub-signal 1323 upon its second passage through plate 1306 is equal and opposite to its deflection during its first passage through plate 1306. As illustrated in FIG. 13B, this causes the physical separation between the two sub-signals 1322 and 1323 to increase during their second passage through birefringent plate 1306. After leaving plate 1306, sub-signals 1322 and 1323 then both pass through Faraday rotator 1304 that non-reversibly imposes a 45° CCW rotation on both their polarization plane orientations about the axis of propagation.

After passing through Faraday rotator 1304, sub-signals 1322 and 1323 then both pass through half-wave plate 1302 that reversibly imposes 45° CCW rotation on both their polarization plane orientations about the axis of propagation. Because halfwave plate 1302 is a reciprocal rotator, this polarization plane rotation is in the CW direction as viewed end-on from a fixed reference point at the left side of the diagram. After passing through half-wave plate 1302, sub-signals 1322 and 1323 then enter and pass through birefringent walk-off plate 1301 with polarization plane orientations that are horizontal and vertical, respectively. Therefore, sub-signal 1322 once again propagates through birefringent plate 1301 as an o-ray that is not deflected and sub-signal 1323 once again propagates through birefringent plate 1301 as an e-ray that is deflected. The deflection of sub-signal 1323 during its second passage through birefringent plate 1301 is identical to its deflection during its second passage through birefringent plate 1306. As illustrated in FIG. 13B, this causes the physical separation between the two sub-signals 1322 and 1323 to increase during their second passage through birefringent plate 1301 such that both fail to intercept the face of input fiber 1310 by a wide margin. In this fashion, the device 1300 operates as a double-stage polarization independent optical isolator.

Elements 1301, 1302, 1303, 1304, and 1306, in combination as shown in FIGS. 13A and 13B are referred to collectively as a double stage polarization independent optical element.

Figure 14:
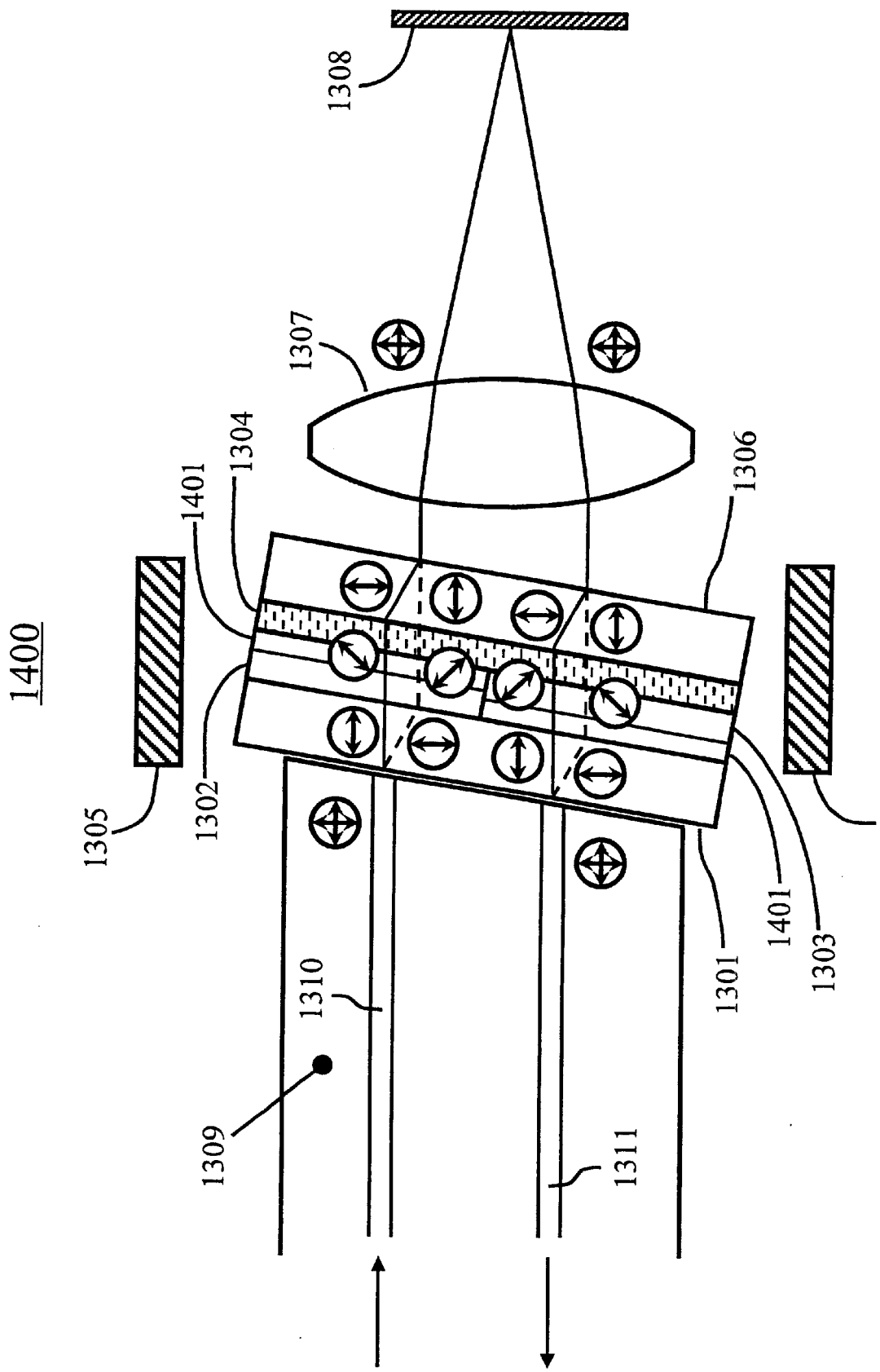
FIG. 14 is a side view showing the structure and operation of a second embodiment of a double-stage polarization independent optical isolator of the present invention having polarization rotation compensation with the loci of forward propagating central light rays denoted.

The polarization rotation compensator 1100 (FIG. 11) may also be incorporated into the double-stage polarization independent optical isolator 1300 of the present invention to give improved broadband isolation performance. Thus, a fourth embodiment of the present invention, which comprises a broadband double-stage polarization independent optical isolator 1400, is provided and is as shown in FIG. 14. The double-stage polarization independent optical isolator 1400 (FIG. 14) is identical to the isolator 1300 (FIG. 13A, 13B) except for the addition of polarization rotation compensator 1100 (shown as element 1401 in two places in FIG. 14). In all other aspects, the operation of isolator 1400 is similar to that already described for isolator 1300 and is not repeated in detail here.

Elements 1301, 1302, 1303, 1304, 1306, and 1401, in combination as shown in FIG. 14 are referred to collectively as a double stage broadband polarization independent polarization-mode-dispersion-free optical element.

The double stage polarization independent optical isolators, isolator 1300 and isolator 1400, have the advantage relative to the single stage isolators, isolator 800 and isolator 1200, of freedom from Polarization Mode Dispersion (PMD). Polarization Mode Dispersion is the phenomenon by which differently polarized components, or sub-signals, comprising an optical signal propagate with different speeds. This duality of speeds can cause unacceptable broadening of the digital pulses comprising a signal. Such pulse broadening may, in turn, cause digital reception errors at the receiver end of an optical communications system. The maximum acceptable level of PMD broadening, in time units, between transmitter and receiver is generally taken as equivalent to one-tenth the width of a digital light pulse. For example, for data transmission rates corresponding to the OC-192 standard, where nominal pulse widths are on the order of 100 pico-seconds, the maximum acceptable level of pulse broadening is on the order of 10 pico-seconds. This translates into a total maximum optical path length difference between sub-signal components of 3 mm between transmitter and receiver, a distance that may encompass many hundreds of kilometers. Different data transmission rates will correspond to different maximum optical path length differences, accordingly.

The maximum acceptable PMD-induced optical path length difference is the cumulative result of all PMD effects in all the optical elements through which a signal propagates, including fiber and non-fiber optical components. Although the PMD broadening of optical fiber increases as the square root of fiber length, the PMD broadening caused by birefringent components is linearly related to the cumulative optical path difference of all such components. Thus, if any PMD effects are produced by non-fiber optical components, either the number of such components, the PMD effect per component, or the data transmission rate must be limited so as to derive acceptable data transmission performance.

The most suitable option is for all components to be PMD-free. However, as may readily be seen by inspection of FIG. 8A or FIG. 12, the two sub-signal components, 802 and 803, may traverse different physical and optical path lengths within the first and second single-stage polarization independent optical isolators, isolator 800 and isolator 1200, respectively. This difference in optical path lengths may cause PMD problems in some situations. However, it is readily seen by inspection of FIG. 13A and FIG. 14 that the two components sub-signals, 1312 and 1313, in the double stage isolators of the current invention, 1300 and 1400, traverse identical physical and optical path lengths. Thus PMD effects are eliminated in isolator 1300 and isolator 1400.

The reflection-type polarization independent optical isolators as already described in the various embodiments of the present invention all incorporate mirrors, such as mirror 807 of the first embodiment (FIG. 8A, 8B) or mirror 1308 of the third embodiment (FIG. 13A, 13B). These mirrors all have reflectivity of preferably 100% so as to fold the signal light rays back, without power loss, for a second passage through the various optical elements comprising the respective isolator and back to the fiber-holding ferrule. In the case of integrated optical passive components, it is desirable to remove a small portion of the signal ray energy for monitoring purposes. This may be easily accomplished by using, for instance, a mirror with less than 100% reflectively and non-zero transmissivity. Thus, for instance, if the 100% reflective mirror 807 of the first embodiment of the present invention, isolator 800, is replaced by a mirror with, for instance, 95% reflectivity and 5% transmissivity, then additional signal monitoring components can be placed on the side of the partially reflective mirror opposite to the isolator. In this way, the isolator is modified so as to become an integrated isolator/passive component set.

Figure 15:
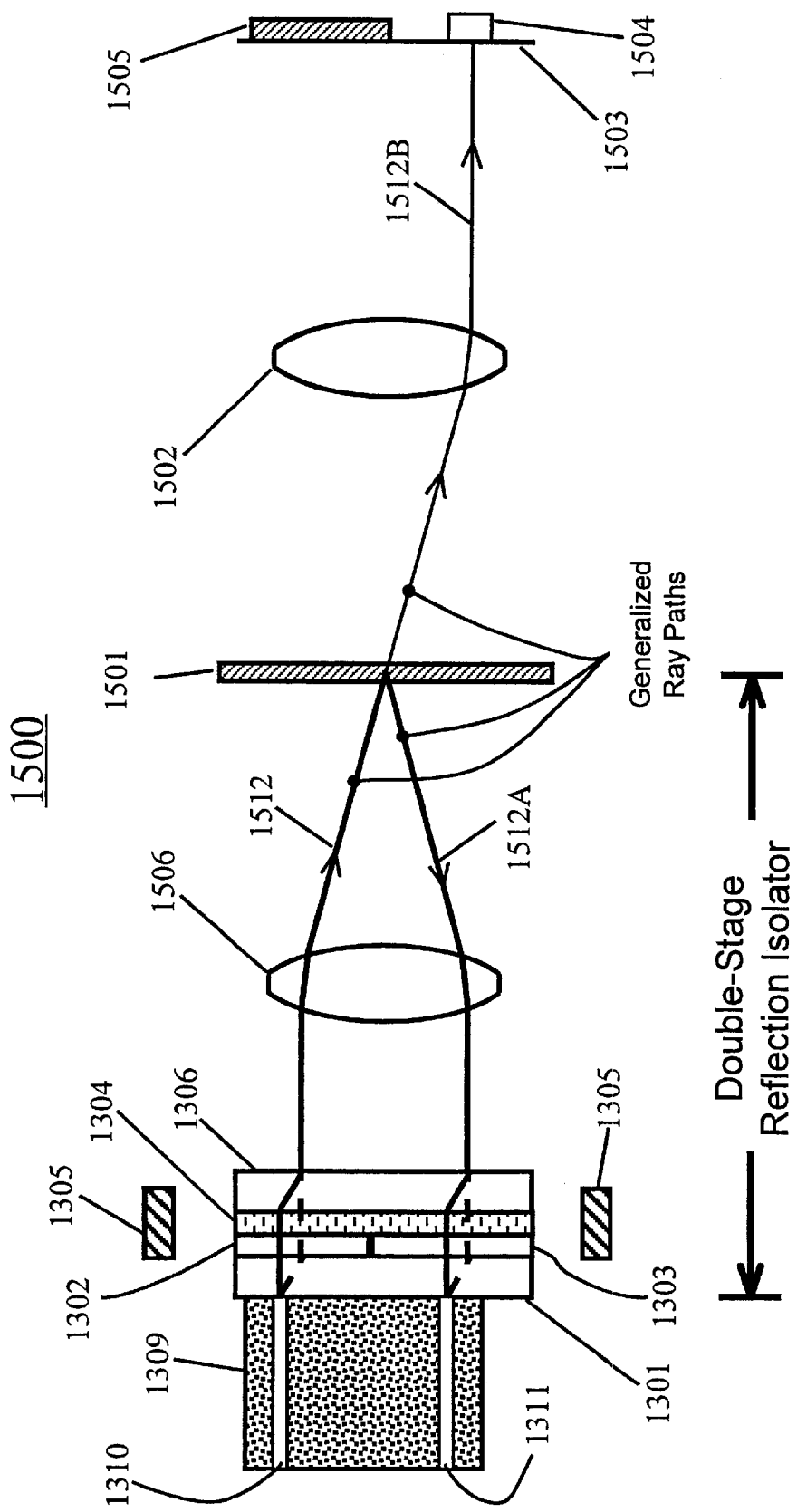
FIG. 15 is a schematic view of a third embodiment of a double-stage polarization independent optical isolator having an additional signal-monitoring function.

In view of the discussion in the above paragraph, there is provided a fifth embodiment of the present invention that comprises an integrated single-stage polarization independent isolator and monitor as illustrated in FIG. 15. The integrated isolator/monitor 1500 of the present invention comprises all of the components of the double-stage isolator 1300 (FIG. 13A, 13B) except for the mirror 1308 that is replaced by a new partially reflective mirror 1501 having approximately 95% reflectivity and approximately 5% transmissivity; lens 806 (FIGS. 8A, 8B, 9, and 12) or lens 1307 (FIGS. 13A, 13B and 14) is also replaced by front lens 1506 in FIG. 15. In addition to these components, isolator/monitor 1500 also comprises a second lens or lens assembly 1502 positioned to the side of mirror 1501 opposite the isolator components together with an anti-reflection (AR) coated window 1503, a photo-detector 1504 and a light absorber 1505 disposed to the side of lens 1502 opposite the isolator components. Taken together with the partially reflective mirror 1501, the components of the isolator/monitor 1500 that are identical to those of isolator 1300 comprise the isolator portion of isolator/monitor 1500. The remaining components of isolator/monitor 1500 comprise the monitor portion of the device. The operation of the isolator portion of isolator/monitor 1500 is identical to that of isolator 1300 except that a portion of the signal light is lost, upon reflection at the partially reflective mirror 1501, to the monitor portion of device 1500 by transmission of that portion of the signal through the partially reflective mirror 1501. The operation of the isolator/monitor 1500 as an optical isolator will therefore not be re-discussed in detail here.

Lenses 806, 1307, 1502 and 1506 can be either curved surface lenses or graded index lenses, which are well-known in the art. Lenses 806, 1307, 1502 and/or 1506 could be replaced by any type of lens without departing from the scope of the present invention.

In addition to its polarization independent optical isolator function, the isolator/monitor 1500 also provides a signal monitoring function. This signal monitoring function of isolator/monitor 1500 is now discussed with reference to FIG. 15. The monitoring function uses a portion of the energy of the forward propagating light signal 1512 as shown in FIG. 15. The partially reflective mirror 1501 separates signal 1512 into two sub-signals, a first sub-signal 1512A which is reflected off partially reflective mirror 1501 and back into the second stage of the isolator portion of isolator/monitor 1500, and a second sub-signal 1512B which is transmitted through partially reflective mirror 1501 to the signal monitoring stage of isolator/monitor 1500. In FIG. 15 and the discussion pertaining thereto, the partially reflective mirror 1501 is shown as having approximately 95% reflectivity and approximately 5% transmissivity. Thus, in this discussion of the operation of isolator/monitor 1500, the sub-signals 1512A and 1512B contain approximately 95% and approximately 5%, respectively, of the light signal power originally contained in signal 1512 prior to encountering partially reflective mirror 1501. One of ordinary skill in the art will readily recognize, however, that, without departing from the spirit or scope of the present invention, the partially reflective mirror 1501 may have values of reflectivity and transmissivity different from 95% and 5%, respectively, depending upon the needs of the user. The effects of the device upon sub-signal 1512A will not be discussed further, having already been discussed with reference to the operation of the double-stage optical isolator 1300 (FIG. 13A, 13B).

The sub-signal 1512B is intercepted by the rear lens 1502 and directed towards the anti-reflection-coated window 1503. Preferably, the coating on this window is designed such that, for all possible wavelengths of light comprising the signal 1512B, at most 5% of the light impinging upon window 1503 is reflected back, in the reverse direction, along the paths of sub-signal 1512B and signal 1512. With this type of anti-reflection coating and the assumed transmissivity of partially reflective mirror 1501, then, at most, a proportion of the signal 1512 equivalent to $(0.05)^3$ or 0.0125% can be reflected back into the light transmission system in the reverse direction. This level of back-reflection, 0.0125%, is equivalent to 39 dB of isolation, which is adequate performance for most applications. The isolator/monitor 1500 also contains a light absorber 1505 which is adjacent to the window 1503 and which absorbs any remaining stray light so as to prevent that stray light from returning to the light transmission system as a spurious signal. The portion of the sub-signal 1512B that is transmitted through anti-reflection-coated window 1503 then impinges upon photo-detector 1504. The well-known operation of the photo-detector, which may be any one of a number of well-known types, is to convert the light energy of sub-signal 1512B into an electronic signal which may be used for monitoring purposes. In this way, the monitoring function of the isolator/monitor 1500 is accomplished.

Figure 16:
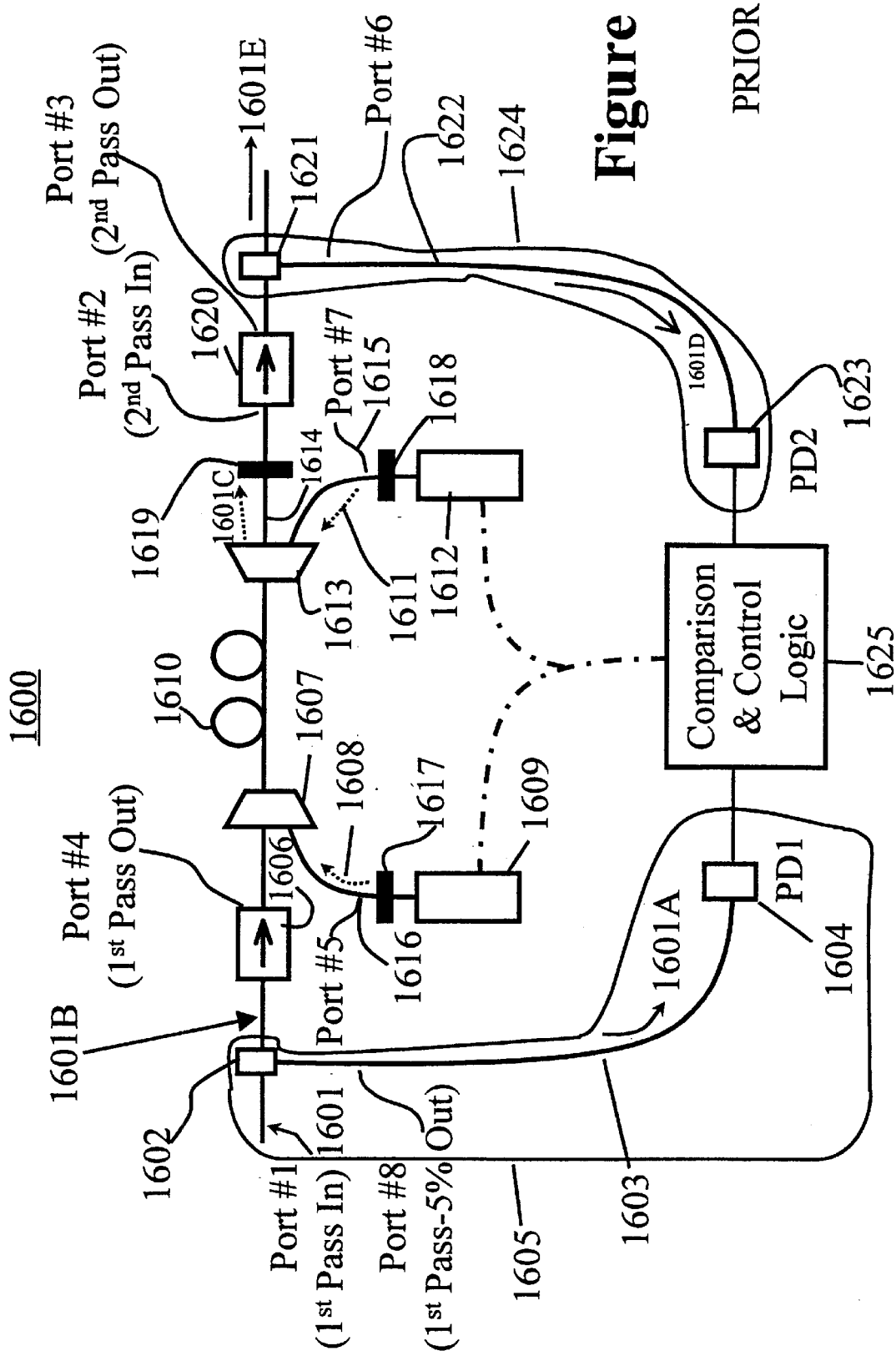
FIG. 16 is a basic block diagram of an optical fiber amplifier showing the assembly of conventional optical passive components and their functional correspondence to the port locations of an integrated optical passive component of the present invention.

An optical isolator can be one of a set of optical passive components within an optical amplifier system. FIG. 16 is a basic block diagram of an optical fiber amplifier system showing the assembly of conventional optical passive components within an Er-doped fiber optical amplifier system (EDFA) 1600. In FIG. 16, an optional input tap 1602 optionally directs a small proportion 1601A (i.e., 5%) of the input signal light 1601 along optical pathway 1603 to first photo-detector 1604. Taken together, the input tap 1602, pathway 1603 and photo-detector 1604 comprise the input monitor component 1605 of the amplifier system. The remaining portion 1601B of the input signal light, which comprises the majority of the input signal, is directed to first optical isolator 1606, which only permits signal light transmission in the forward direction. After passing through isolator 1606, the signal light 1601B is directed to the first Wavelength Division Multiplexer (WDM) 1607. First laser light 1608 from co-pump laser 1609 is also directed to WDM 1607. The function of WDM 1607 is to direct the pathways and directions of three separate lights—signal light 1601B, first laser light 1608, and residual second laser light 1611—according to their respective wavelengths. The origin of second laser light 1611, which passes through fiber 1610 in the reverse direction, is discussed further below. In WDM 1607, signal light 1601B is passed together with laser light 1608 into the Er-doped fiber 1610 in the forward direction. A further function of WDM 1607 is to direct residual second laser light 1611 along pathway 1616 in the reverse direction.

The signal light 1601B and the laser light 1608 propagate together in the forward direction through Er-doped fiber 1610. Also propagating through Er-doped fiber 1610 in the reverse direction is laser light 1611 that originates from counter-pump laser 1612. The wavelength of laser light 1608 is ordinarily 980 nm whereas the wavelength of laser light 1611 is ordinarily 1480 nm. The wavelength of the signal light 1601B is always greater than the wavelength of either of the laser lights 1608 or 1611.

As shown in FIG. 16, signal light 1601B becomes amplified by the optical gain of the Er-doped fiber under the condition of laser light excitation and is therein transformed into amplified signal 1601C. Amplified signal light 1601C and residual laser light 1608 are passed from the Er-doped fiber 1610 to the second WDM 1613. The second WDM 1613 separates the pathways of the three lights 1601C, 1608, and 1611 according to their respective wavelengths. Amplified signal 1601C is directed in the forward direction along pathway 1614 whereas residual laser light 1608 is directed in the forward direction along path 1615. Moreover, laser light 1611 from counter-pump laser 1612 enters WDM 1613 in the reverse direction via path 1615, and therefore a further function of WDM 1613 is to direct light 1611 into Er-doped fiber 1610 in the reverse direction.

After leaving second WDM 1613 and propagating along path 1614 in the forward direction, amplified signal 1601C passes through an optional gain-flattening filter 1619 and thence to second optical isolator 1620. Optical isolator 1620 only permits signal light transmission in the forward direction away from the Er-doped fiber 1610 so that spurious back-reflected signals do not become amplified. After passing through the second isolator 1620, amplified signal 1601C passes through an optional output tap 1621 that optionally directs a small proportion 1601D (i.e., 1%) of the amplified signal along pathway 1622 to second photo-detector 1623. Taken together, the output tap 1621, pathway 1622 and photo-detector 1623 comprise the output monitor component 1624 of the amplifier system. The remainder of the amplified signal 1601E exits the amplifier system after passing through optional output tap 1621.

Also shown in FIG. 16 are a first bandpass filter or isolator 1617 disposed between co-pump laser 1609 and pathway 1616 and a second bandpass filter or isolator 1618 disposed between counter-pump laser 1612 and pathway 1615. The functions of elements 1617 and 1618 are to prohibit the entry of reverse propagating second laser light 1611 into co-pump laser 1609 and the entry of forward propagating first laser light 1608 into counter-pump laser 1612, respectively. The use of bandpass filter or isolator 1617 and bandpass filter or isolator 1618 is necessitated by the fact that either laser 1609 or 1612 could be severely damaged by entry of laser light of the other kind.

The Er-doped fiber optical amplifier system (EDFA) 1600 as described herein above is known in the art.

Further shown in FIG. 16 are the functional correspondences of various ports #1 through #8 of the sixth embodiment of the present invention (described herein below) to the various locations within the generalized optical amplifier system 1600. When the sixth embodiment of the present invention is used, elements 1602, 1604, 1606, 1607, and 1617 are replaced by a first pass through the sixth embodiment, and elements 1613, 1618, 1620, 1621, and 1623, are replaced by a second pass through the sixth embodiment, in the EDFA 1600 of FIG. 16. During the first pass through the sixth embodiment, 5% of signal 1601 follows pathway 1603 through Port #8. During the second pass through the sixth embodiment, 0.2% of signal 1601 follows pathway 1622 through Port #6. The operation and advantages of the sixth embodiment of the present invention, which comprises a set of integrated optical passive components with single stage isolation, are discussed in greater detail below.

Finally, also shown in FIG. 16 is an optional comparison and control logic system 1625 which represents a set of electronic or computer systems together with decision-making software or firmware which monitors the electronic outputs of both optional photo-detectors 1604 and 1623, and controls the outputs of the two lasers 1609 and 1612 accordingly so as to obtain optimal amplification performance. The system 1625 is only shown to illustrate the context of the present invention and is not a component of the present invention or necessarily of optical amplifiers in general.

Figure 17:
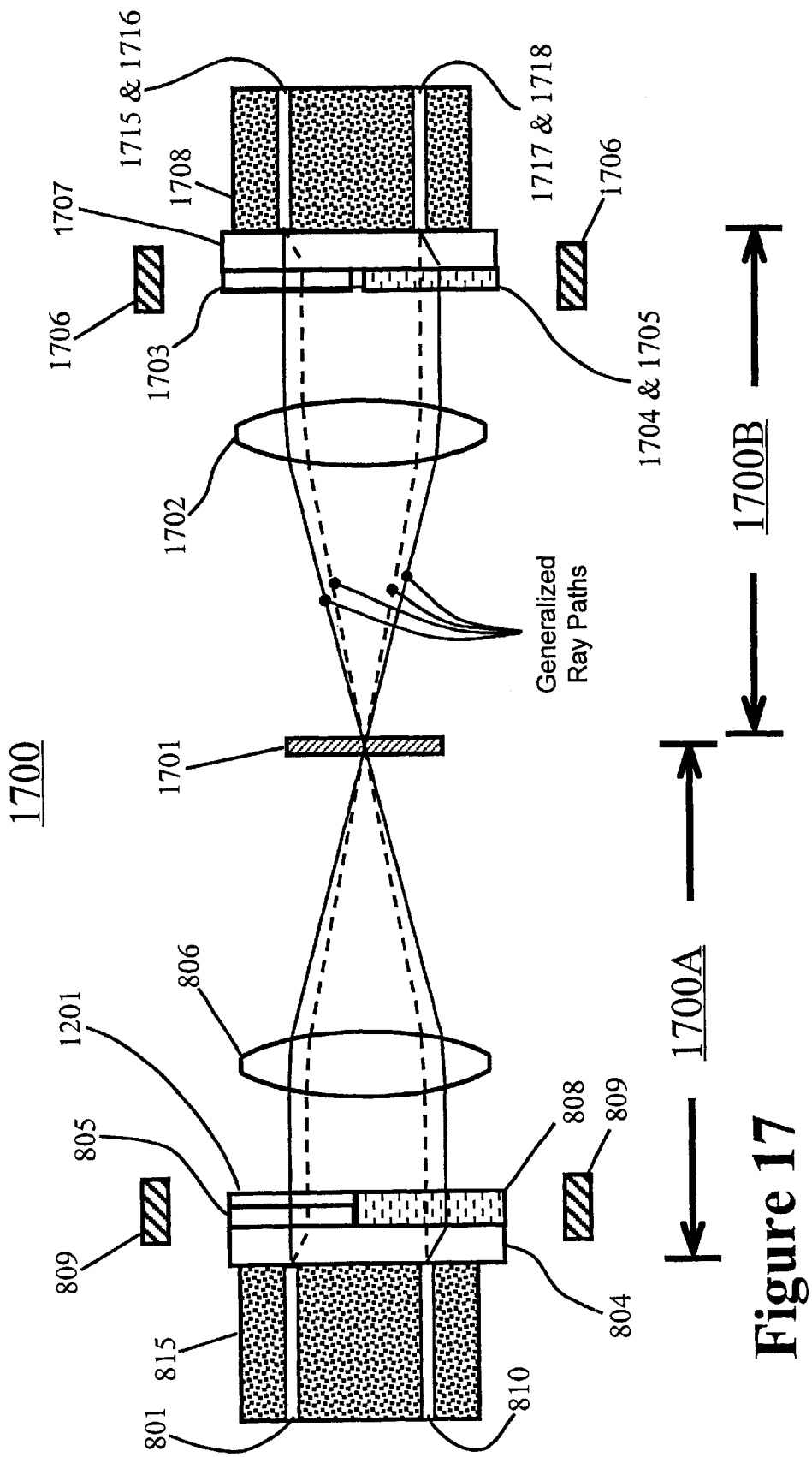
FIG. 17 is a side view of an embodiment of an integrated optical passive component of the present invention for use with an optical fiber amplifier and which encompasses the combined functions of pre-amplification and post-amplification single-stage signal isolation, pre-amplification and post-amplification signal monitoring, co-propagating and counter-propagating pump beam injection (multiplexing), and mutual co-propagating and counter-propagating pump beam isolation.
Figure 18:
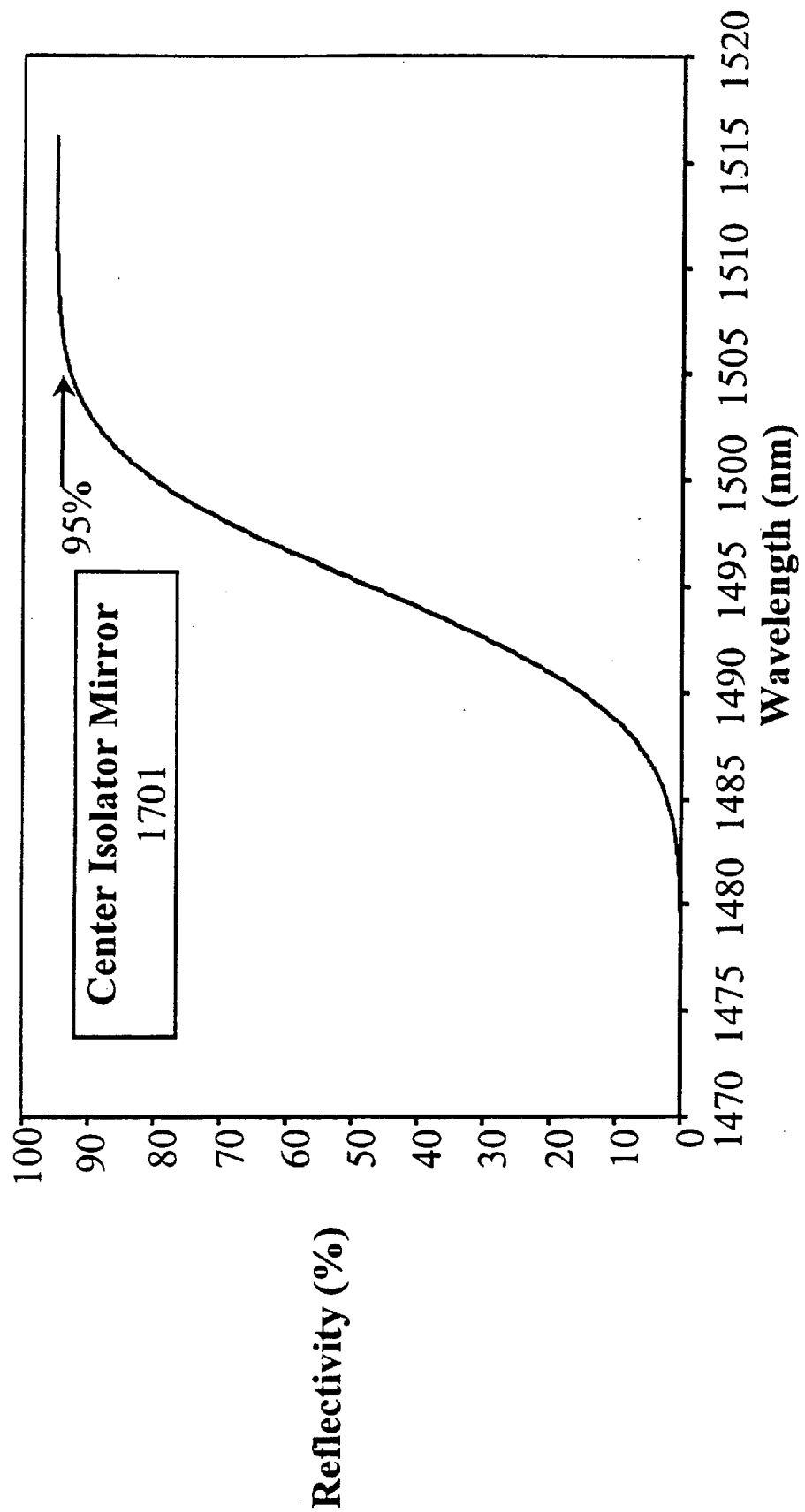
FIG. 18 is graph of the preferred variation with wavelength of the reflectivity of the center partial reflector element of the integrated optical passive component of FIG. 17.

The sixth embodiment of the present invention, referred to as a polarization independent integrated single stage isolator, monitor, and amplifier 1700 (referred to as isolator/monitor/amplifier 1700) and which comprises a set of integrated optical passive components with single stage isolation, is illustrated in FIG. 17. The integrated set of optical passive components (or broadband single-stage reflection isolator) 1700A, which is shown to the left side of FIG. 17, is physically and functionally identical to the broadband single-stage polarization independent optical isolator 1200 except that (a) the mirror 807 of isolator 1200 is replaced by a partially reflective mirror 1701 and (b) there are two input fibers 801A, 801B (collectively shown and referred to as 801 in FIG. 17) and two output fibers 810A, 810B (collectively shown and referred to as 810 in FIG. 17), as explained herein below. A preferred graph of the reflectivity versus wavelength properties of partially reflective mirror 1701 is shown in FIG. 18. Except for this mirror substitution, the identity and arrangement of components of the isolator half of integrated components 1700A are identical to those of isolator 1200. These common components include the ferrule 815, the input fibers 801, the output fibers 810, the birefringent plate 804, the $\lambda/2$ plate 805 providing reversible 45° CCW polarization plane rotation, the Faraday rotation element 808 providing non-reversible 45° CCW polarization plane rotation, the magnets 809, the lens 806, and the polarization rotation compensator 1201. Together with the partially reflective mirror 1701, these components comprise a single-stage broadband optical isolator 1700A whose operation is identical to that of isolator 1200 except: (a) a portion of the input signal light is transferred to the second half of integrated components 1700B by transmission through the partial reflector 1701, (b) two separate laser lights are transmitted into and out of the isolator/monitor/amplifier 1700 via transmission through the partial reflector 1701, (c) the two input fibers 801 and two output fibers 810 are used in pairs such that one input fiber and one output fiber correspond to a single signal pass through the isolator 1700, and (d) forward propagating signals make two consecutive passes through the isolator 1700 first using one and then the other pair of fibers.

As discussed herein above, elements 804, 805, 808, and 1201, in combination as shown in FIGS. 12 and 17 are referred to collectively as a single stage broadband polarization independent optical element.

Additional components 1700B, referred to as monitor/amplifier components, of device 1700 which are not found in isolator 1200 include a rear lens 1702, a first rear $\lambda/2$ plate 1703 and a second rear $\lambda/2$ plate 1704, a rear Faraday rotator 1705 and associated magnets 1706, a rear birefringent walk-off plate 1707, a rear four fiber ferrule 1708 and four rear fibers or ports 1715, 1716, 1717, and 1718.

Figure 19:
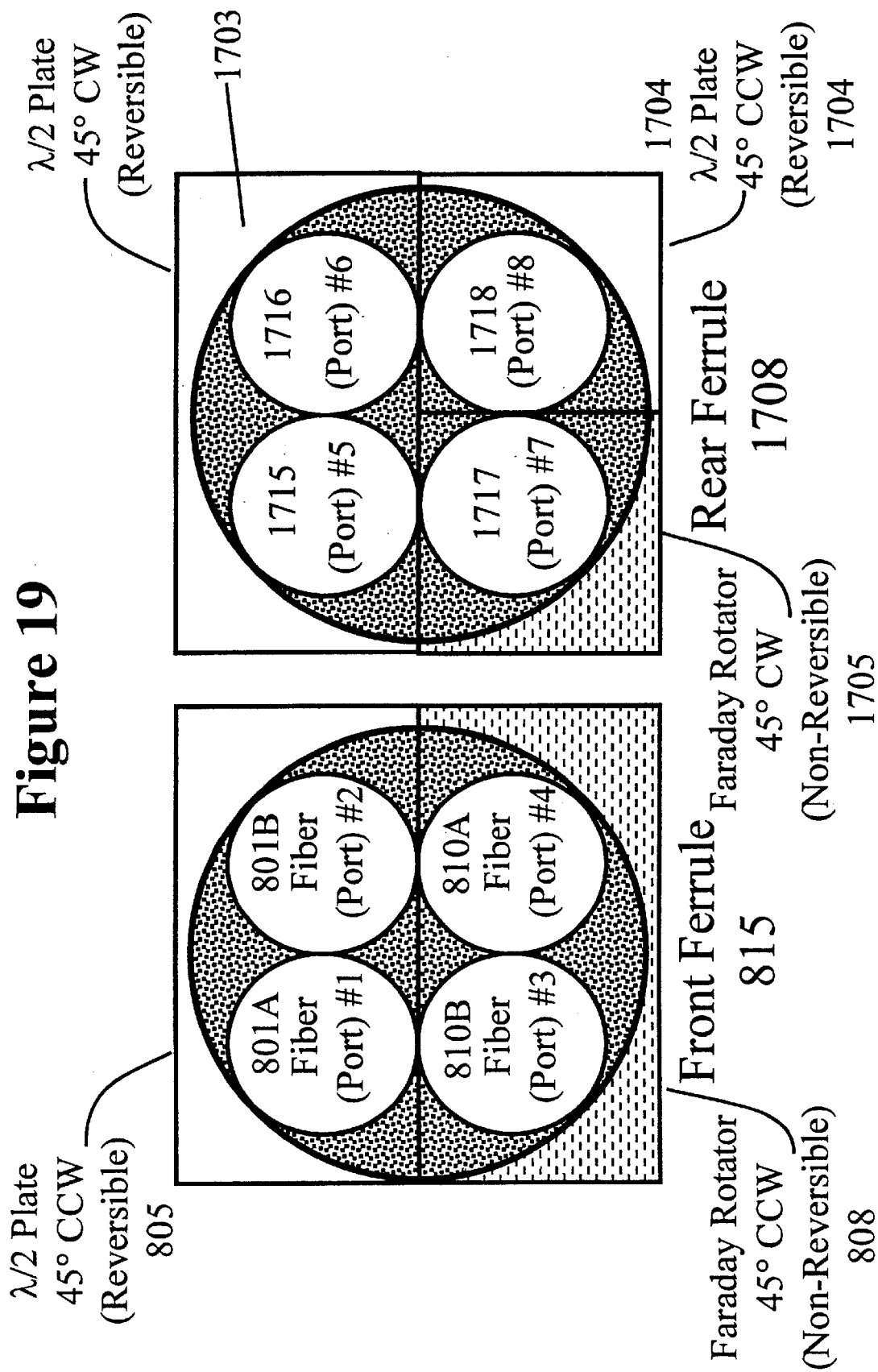
FIG. 19 is a pair of end views of the front and rear fiber (port) configurations and associated optical elements of the integrated optical passive component of FIG. 17.

Although the second rear $\lambda/2$ plate 1704 cannot be shown separately from the rear Faraday rotator 1705 in the side view which is FIG. 17, their respective locations are adequately represented in the cross sectional view which is shown in FIG. 19. Finally, for clarity, the sets of magnets 809 and 1706 are not shown in FIG. 19 or in subsequent figures.

Collectively, elements 1703, 1704, 1705, and 1707 in the configuration shown in FIGS. 17 and 19 are referred to as a monitor/amplifier optical element 1700B.

In the isolator/monitor/amplifier 1700, which comprises a set of integrated optical passive components (FIG. 17), the partially reflective mirror preferably has a variation of reflectivity with wavelength as shown in FIG. 18, with preferably 95% reflectivity for signal wavelengths and preferably 0% for the shorter pump laser wavelengths. The mirror 1701 must have good reflectivity for telecommunications signals of 1550 nanometers.

Also, in the isolator/monitor/amplifier 1700, the four front fibers or ports are tightly secured within front four-fiber ferrule 815 and the four rear fibers or ports are tightly secured within rear four-fiber ferrule 1708 and arranged as shown in FIG. 19. The cross-sectional views of FIG. 19 are both drawn as viewed from the left side of the device shown in FIG. 17. The end face of rear ferrule 1708 is polished flat together with the fibers contained therein. The fibers or ports are so arranged (FIG. 19) such that Fiber (Port) #5 1715, #6 1716, #7, 1717, and #8 1718 in the rear ferrule 1708 are directly opposite, respectively, to Fiber (Port) #1 801A, #2 801B, #3 810B, and #4 810A in the front ferrule 815.

FIG. 19 illustrates the numbering scheme of the fibers (or ports) of the sixth embodiment of the present invention, shown in FIG. 17 (which is a side view of the sixth embodiment of the present invention), and, further, shows the optical elements mounted in front of or adjacent to each port to rotate the light entering or exiting each port.

As shown in FIG. 19, fibers 801A, 801B, 810A and 810B are located in the front ferrule 815 of the isolator/monitor/amplifier 1700. Fibers 801A and 810A (FIG. 19) comprise the input and output, respectively, for the first pass of a signal through the isolator portion 1700A of isolator/monitor/amplifier 1700. Likewise, fibers 801B and 810B (FIG. 19) comprise the input and output, respectively, for the second pass of a signal through the isolator portion 1700A of isolator/monitor/amplifier 1700. Disposed to the rear of—that is, in the direction of partial reflector 1701—and immediately adjacent to the front ferrule 815 and fibers 801A, 801B, 810A and 810B is the front birefringent walk-off plate 804, which, for clarity, is not shown in FIG. 19. As shown in FIG. 19, the front $\lambda/2$ plate 805 and the front Faraday rotator 804 are disposed immediately adjacent to and to the rear of birefringent plate 804 such that they intercept the optical pathways of the pair of input fibers, 801A and 801B and the pair of output fibers, 810A and 810B, respectively As further shown in FIG. 19, fibers 1715, 1716, 1717 and 1718 are located in the rear ferrule 1708 of the isolator/monitor/amplifier 1700. Disposed to the front of—that is, in the direction of partial reflector 1701—and immediately adjacent to the rear ferrule 1708 and fibers 1715, 1716, 1717 and 1718 is the rear birefringent walk-off plate 1707, which, for clarity, is not shown in FIG. 19. Also present, in isolator/monitor/amplifier 1700, are first and second rear $\lambda/2$ plates 1703 and 1704 which are both oriented so as to provide reversible 45° CW and CCW, respectively, polarization plane rotation of light signals transmitted therethrough. Also present, in isolator/monitor/amplifier 1700, is a rear Faraday rotator 1705 and magnets 1706, which are oriented so as to provide non-reversible 45° CW polarization plane rotation of light signals transmitted therethrough. The first and second rear $\lambda/2$ plates 1703 and 1704 and the rear Faraday rotator 1705 are disposed directly adjacent to and to the front of the rear birefringent walk-off plate 1707 such that the first rear $\lambda/2$ plate 1703 intercepts the optical pathway to fibers 1715 and 1716, the second rear $\lambda/2$ plate 1704 intercepts the optical pathway to fiber 1718 and Faraday rotator plate 1705 intercepts the optical pathway to fiber 1717, as shown in FIG. 19.

Each fiber 801A, 801B, 810A, 810B, 1715, 1716, 1717, and 1718 shown in FIG. 9 is a conventional fiber of uniform size having an approximately 8 micrometer core surrounded by approximately 120 micrometer cladding. When a signal light is directed by the present invention to not enter a fiber by the walk-off effect, the signal light is typically absorbed by the cladding. Therefore, optical isolators are not perfect isolators, but single-stage isolators typically provide 35 db of isolation, which is a critical point for analog communications, as is well known in the art.

With four fibers in each ferrule, as shown in FIG. 19 and in the prior art, the alignment (both lateral and rotational) of each fiber is easy, controlled, and reproducible.

As will be apparent from the collective descriptions of the subsequent figures, port #1 and port #4 form an input/output pair of ports, and port #2 and port #3 form another input/output pair of ports.

The isolator/monitor/amplifier 1700 of the second embodiment of the present invention, shown in FIG. 17, is an integrated system of optical passive components. The isolator/monitor/amplifier 1700 can replace, with improved function and performance, the following optical passive components in the optical system 1600 shown in FIG. 16: input tap 1602, isolator 1606, wavelength division multiplexer 1607, wavelength division multiplexer 1613, isolator 1620, and output tap 1621. In replacing the foregoing optical components, two passes of signal light through the isolator/monitor/amplifier 1700 of the present invention must be made to duplicate the function of the replaced optical components. The first pass through isolator/monitor/amplifier 1700 corresponds to the function provided by input tap 1602, isolator 1606, and wavelength division multiplexer 1607 shown in FIG. 16. After the first pass through the isolator/monitor/amplifier 1700, the output signal light then travels through Er-doped fiber 1610 back to isolator/monitor/amplifier 1700 for a second pass therethrough. The second pass through isolator/monitor/amplifier 1700 corresponds to the function provided by wavelength division multiplexer 1613, isolator 1620, and output tap 1621 shown in FIG. 16.

FIGS. 20A and 20B show a schematic overview of the operation of isolator/monitor/amplifier 1700 of the present invention. FIGS. 21–24 are more detailed views of the isolator/monitor/amplifier 1700 of the present invention.

Figure 21:
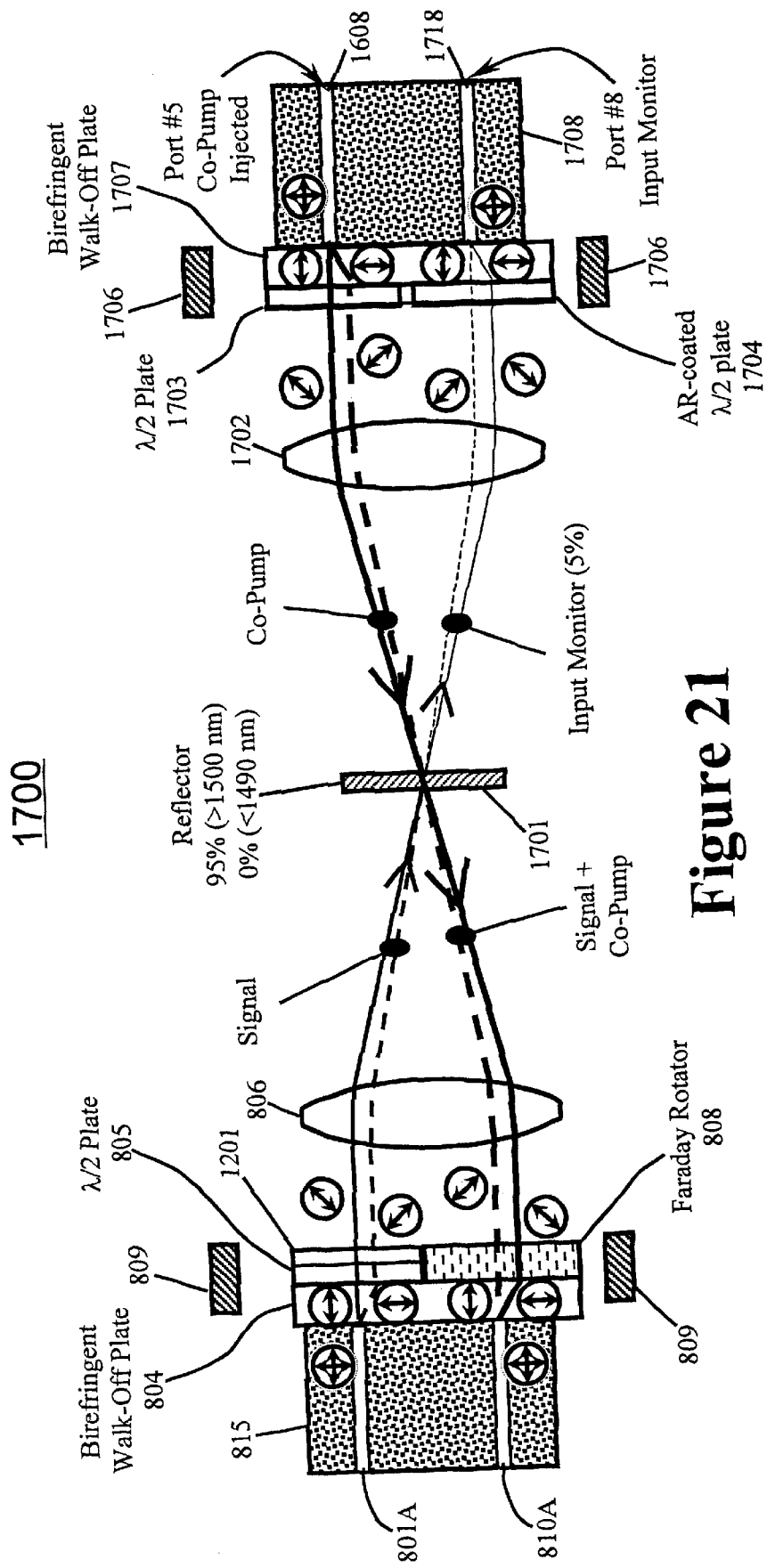
FIG. 21 is a detailed view of the loci and polarization states of central light rays of two principal polarizations propagating in the forward direction during the first pass (pre-amplification) through the integrated optical passive component of FIG. 17.
Figure 22:
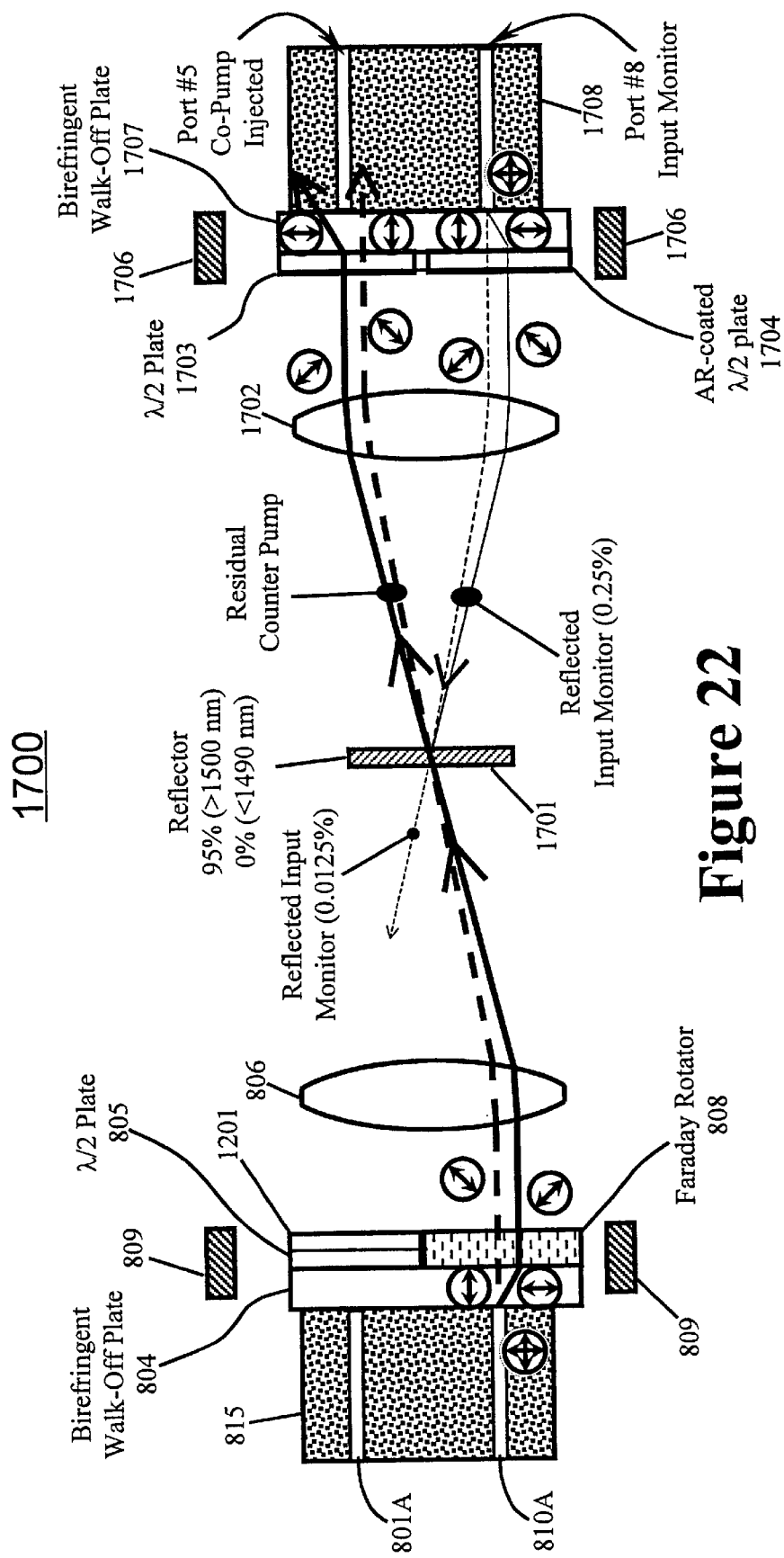
FIG. 22 is a detailed view of the loci and polarization states of central light rays of two principal polarizations propagating in the reverse direction within the specific optical pathways defining the first pass through the integrated optical passive component of FIG. 17.

FIG. 20A is an overview of the first pass through isolator/monitor/amplifier 1700. FIG. 21 and FIG. 22 illustrate optical pathways comprising the first pass through the isolator/monitor/amplifier 1700 in the forward and reverse directions, respectively, shown in FIG. 20A.

Figure 23:
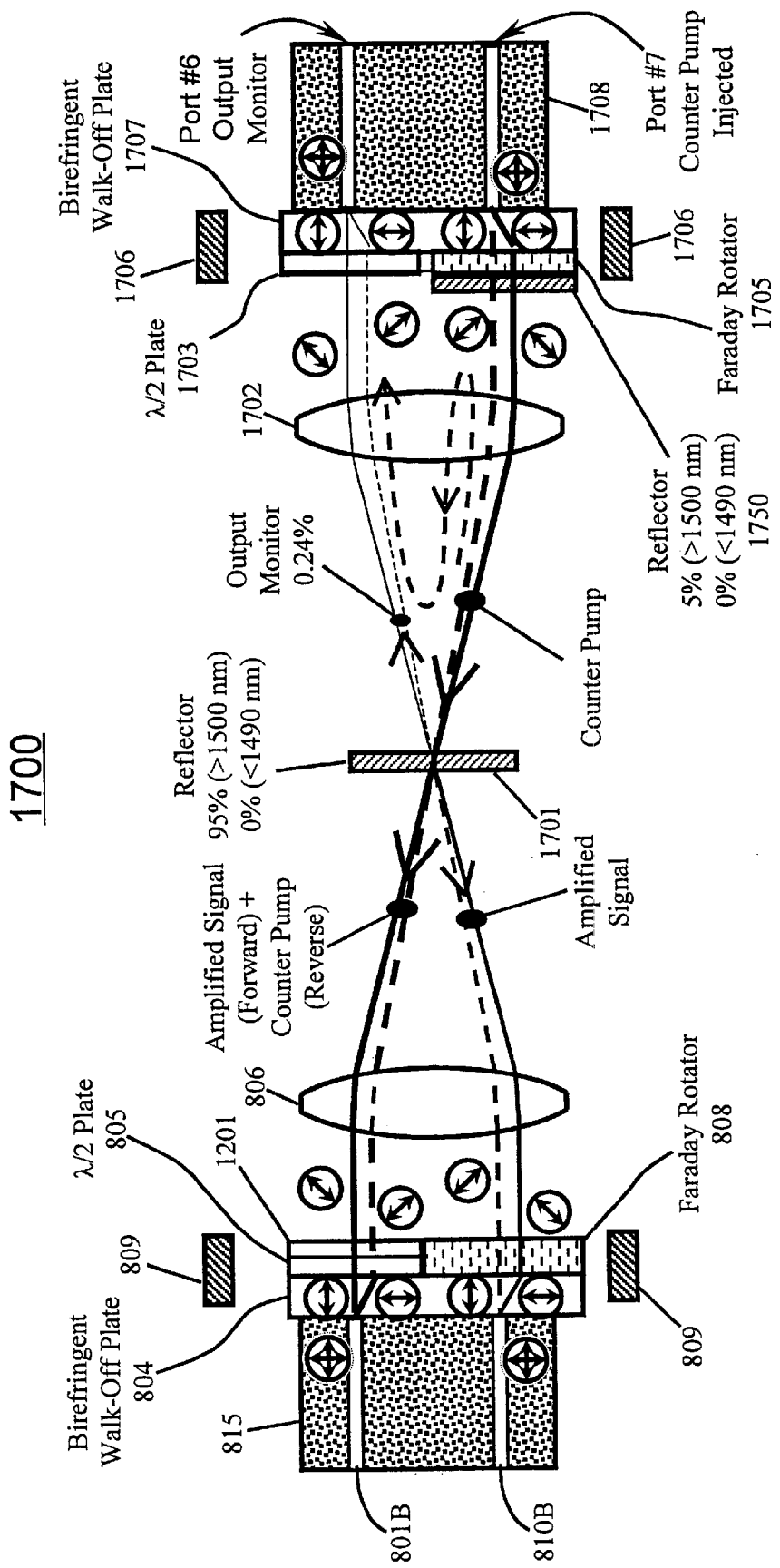
FIG. 23 is a detailed view of the loci and polarization states of central light rays of two principal polarizations propagating in the forward direction during the second pass (post-amplification) through the integrated optical passive component of FIG. 17.
Figure 24:
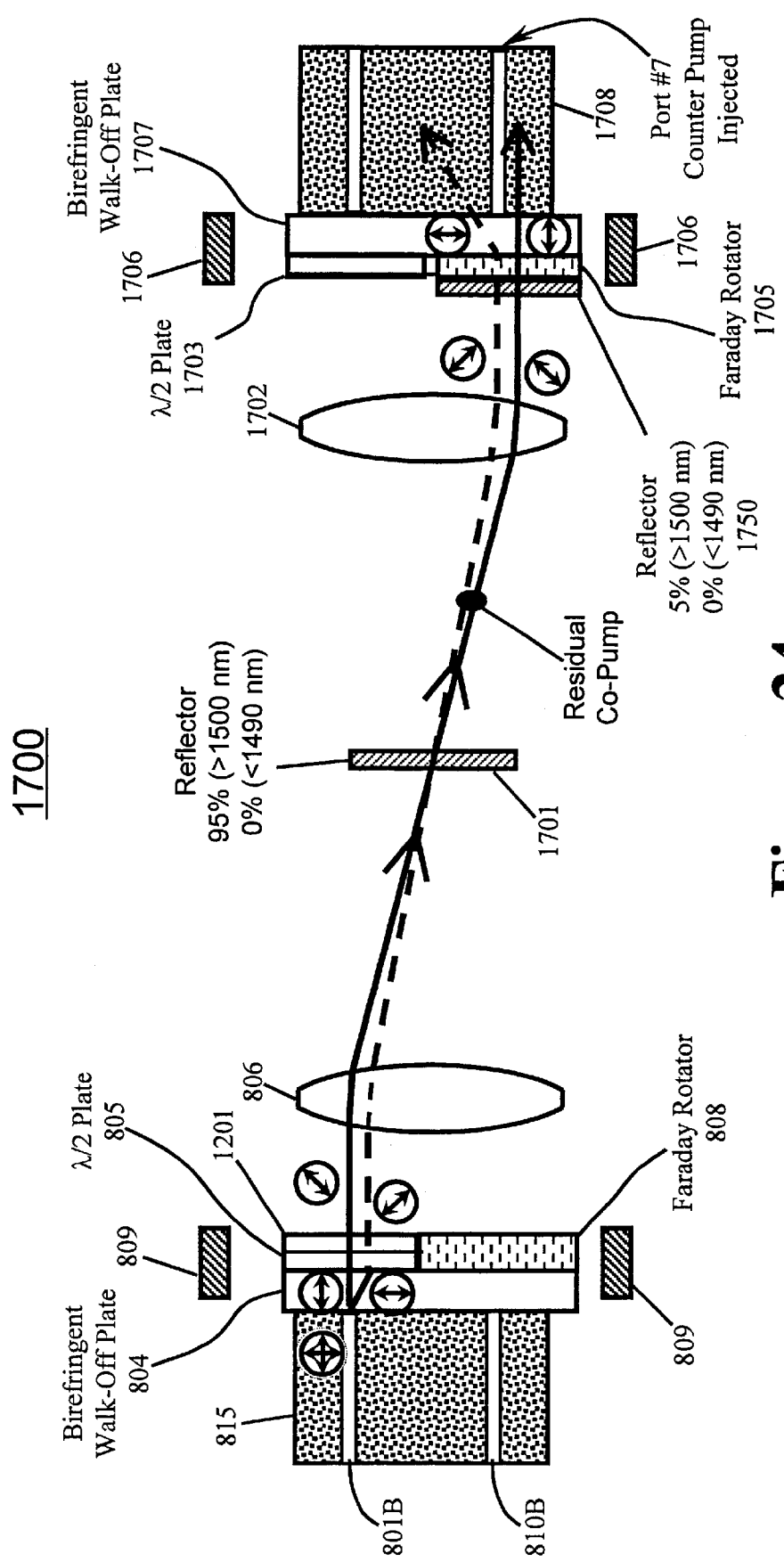
FIG. 24 is a detailed view of the loci and polarization states of central light rays propagating in the reverse direction within the specific optical pathways defining the second pass through the integrated optical passive component of FIG. 17.

Likewise, FIG. 20B is an overview of the second pass through isolator/monitor/amplifier 1700. FIG. 23 illustrates optical pathways comprising the second pass through the isolator/monitor/amplifier 1700 in the allowed direction, shown in FIG. 20B, and FIG. 24 illustrates the pathway of residual pump laser light and amplified input light in a second pass through the isolator/monitor/amplifier 1700, which is not directed to any port in the isolator/monitor/amplifier 1700.

The following explanation of the isolator/monitor/amplifier 1700 of the present invention shown in FIG. 17 is made with reference to FIGS. 20A, 20B. For clarity in FIGS. 20A and 20B, lenses 806 and 1702, and magnets 809 and 1706 are not shown, and optical elements adjacent to each port (discussed herein above with reference to FIGS. 17 and 19, and herein below with reference to FIGS. 21–24) are shown collectively as follows. In the following explanation with reference to FIGS. 20A and 20B, and in the explanation with reference to FIGS. 21–24, as shown in the foregoing figures, the optical elements 850 adjacent to Port #1 include birefringent walk-off plate 804, λ/2 plate 805, and polarization rotation compensator 1201; the optical elements 852 adjacent to Port #2 include birefringent walk off plate 804, λ/2 plate 805, and polarization rotation compensator 1201; the optical elements 854 adjacent to Port #3 include birefringent walk-off plate 804 and Faraday rotator 808; the optical elements 856 adjacent to Port #4 include birefringent walk-off plate 804 and Faraday rotator 808; the optical elements 858 adjacent to Port #5 include λ/2 plate 1703, and birefringent walk-off plate 1707; the optical elements 860 adjacent to Port #6 include λ/2 plate 1703, and birefringent walk-off plate 1707; the optical elements 862 adjacent to Port #7 include reflector 1750, Faraday rotator 1705, and birefringent walk-off plate 1707; and the optical elements 864 adjacent to Port #8 include anti-reflective coated λ/2 plate 1704, and birefringent walk-off plate 1707.

As illustrated in FIGS. 20A and 20B and 21–24, a signal light makes two passes through the optical isolator section 1700A of isolator/monitor/amplifier 1700. These first and second passes correspond to passes through isolator 1606 and 1620 of FIG. 16. Because of these and other exact correspondences, the same reference numerals introduced in FIG. 16 are used for the various signal and laser lights illustrated in FIGS. 20A and 20B and 21–24. In addition, when reference is made to the port number, the fiber corresponding to that port number in FIG. 17 is also supplied (i.e., port #1 801A).

In FIG. 20A, input signal light 1601 enters for a first pass through isolator/monitor/amplifier 1700 through Port #1, fiber 801A (FIG. 19). This signal passes through the optical elements adjacent to Port #1 (including birefringent walk-off plate 804, λ/2 plate 805, and polarization rotation compensator 1201, in this order) and thence through the lens 806 and thence to the partial reflector 1701. A small proportion of this signal light is transmitted through partial reflector 1701 (shown in FIG. 20A as signal 1601A) and thence to rear lens 1702 which directs it through the optical elements adjacent to Port #8 1718 (including λ/2 plate 1704, and birefringent walk-off plate 1707, in this order) and ultimately into Port #8 1718 (FIG. 19). The light signal 1601A entering Port #8 is delivered to a photo-detector (not shown) for input monitoring and thus this corresponds to signal 1601A (FIG. 16). A much larger proportion of signal light 1601 is reflected off of partial reflector 1701 and back to front lens 806 which directs it through the optical elements adjacent to Port #4 810A (including Faraday rotator 808, and birefringent walk-off plate 804, in this order) and ultimately into Port #4 810A (FIG. 19). The signal light that exits isolator/monitor/amplifier 1700 through Port #4 is directed to an Er-doped fiber 1610 (FIG. 16) and thus this corresponds to signal 1601B.

In addition to signal lights traveling through isolator/monitor/amplifier 1700 of the present invention, there are laser lights traveling therethrough, as well. The additional pathways of the signal lights, including signal 1601B, followed through isolator/monitor/amplifier 1700 after entering the Er-doped fiber 1610 are further discussed with reference to FIG. 20B, after a discussion of the laser light entering isolator/monitor/amplifier 1700 through Port #5 1715 and Port #7 1717 shown in FIG. 20A and FIG. 20B, respectively.

As shown in FIG. 20A, a first laser light pump beam 1608 is input to isolator/monitor/amplifier 1700 through Port #5 1715 (FIG. 19). Isolator/monitor/amplifier 1700 is configured such that laser light 1608 passes through the optical elements directly adjacent to Port #5 1715 (including birefringent walk-off plate 1707 and λ/2 plate 1703, in this order) and thence through rear lens 1702 and thence through partial reflector 1701 without being reflected and thence into the same optical pathway as signal 1601B which ultimately leads to Port #4 810A (FIG. 19). Thus, both first laser light 1608 and signal 1601B exit the first-pass pathway of isolator/monitor/amplifier 1700 through Port #4 810A to be delivered to Er-doped fiber 1610 (FIG. 16).

Furthermore, residual second laser light 1611, produced by counter-pump laser 1612 as shown in FIG. 16, travels in the Er-fiber 1610 (FIG. 16) and may enter the isolator/monitor/amplifier 1700 in the reverse direction—opposite to the signal 1601 normal propagation direction—through Port #4 810A. This second laser light 1611, which is discussed in further detail herein below with reference to FIG. 20B, follows a path through isolator/monitor/amplifier 1700 (FIG. 20B) exactly opposite to that of first laser light 1608, enters isolator/monitor/amplifier 1700 through Port #7 1717, passes through reflector 1701 without being reflected (since the wavelength of this second laser light 1611 is below 1490 nanometers) enters the Er-doped fiber 1610 through Port #2 801B, returns to isolator/monitor/amplifier 1700 through Port #4 810A, and arrives at Port #5 1715 (FIG. 19). Second laser light 1611 cannot enter Port #5 because the optics of the front birefringent walk-off plate 804, the Faraday rotator 808, the λ/2 plate 1703, and the birefringent walk-off plate 1707 of the isolator/monitor/amplifier 1700, which are along the pathway followed by signal 1611 as shown in FIG. 20B, comprise an optical isolator similar to that shown in FIG. 8B.

Returning now to the foregoing discussion regarding signal lights, upon exit through Port #4 810A from the isolator/monitor/amplifier 1700 of the present invention, signal light 1601B is amplified and transmitted through an Er-doped fiber (not shown in FIG. 20A or FIG. 20B) to Port #2 801B of isolator/monitor/amplifier 1700 as signal light 1601C.

After passage through Er-doped fiber 1610, the amplified signal 1601C (FIG. 16), along with residual first laser light 1608, is re-delivered to isolator/monitor/amplifier 1700 for a second pass therethrough (FIG. 20B) via second input Port #2 801B (FIG. 19). The signal 1601C passes through the optical elements adjacent to Port #2 (including birefringent walk off plate 804, λ/2 plate 805, and polarization rotation compensator 1201, in this order) and thence through the lens 806 and thence to the partial reflector 1701. Most of the energy of signal 1601C is reflected off partial reflector 1701, back through front lens 806, and thence through the optical elements (including Faraday rotator 808, and birefringent walk-off plate 804, in this order) adjacent to Port #3 810B (FIG. 19) to finally exit through Port #3. This exiting signal therefore corresponds to signal 1601E of FIG. 16. However, a small proportion of signal light 1601C and all of the residual first laser light 1608 is transmitted through partial reflector 1701 and thence to rear lens 1702, which directs it through the optical elements (including reflector 1750, Faraday rotator 1705, and birefringent walk-off plate 1707, in this order) adjacent to Port #7 1717 (FIG. 19). This small proportion of the signal light 1601C which is transmitted through partial reflector 1701 is the signal light 1601D shown in FIG. 20B.

The optical components adjacent to Port #7 include a partial reflector or reflective coating 1750 that permits most of the energy of signal light 1601D and all of the energy of the first laser light 1608 to pass through towards Port #7 and that also reflects a small proportion of the signal light away from Port #7. Most of the signal light 1601D or first laser light 1608 that impinges upon this partial reflector 1750 is transmitted therethrough towards Port #7. The light transmitted towards Port #7 cannot actually enter Port #7, however, because the optical components between Port #2 and Port #7 (including the above-mentioned elements 804, 805, 1201, 1705, and 1707) comprise an optical isolator that only permits reverse-direction passage of the second laser light 1611. The small proportion of signal light that is reflected back from the partial reflector 1750 is directed back through rear lens 1702 for a second time, thence to partial reflector 1701 (FIG. 20B), thence to rear lens 1702 for a third time and finally to Port #6 1716 (FIG. 19). Signal light entering Port #6 is directed to a photo-detector (not shown) for output monitoring.

Finally, the second laser light pump beam 1611 is input (FIG. 20B) to isolator/monitor/amplifier 1700 through Port #7 1717 (FIG. 19). Isolator/monitor/amplifier 1700 is configured such that second laser light 1611 passes through the optical elements directly adjacent to Port #7 1717 in the reverse direction, thence through rear lens 1702 and thence through partial reflector 1701 and thence into the same optical pathway as signal 1601C in the reverse direction. In the reverse direction, this pathway ultimately leads (FIG. 20B) to Port #2, from which the second laser light 1611 is directed into the Er-doped fiber 1610 in the reverse propagation direction. The optical components in the pathway (FIG. 20B) between Port #7 1717 and Port #2 801B comprise an optical isolator that only permits passage of light in the reverse direction.

Therefore, the amplifier components of the isolator/monitor/amplifier 1700 comprise additional single-stage optical isolators for the counter-pump and the co-pump laser lights 1611 and 1608, respectively. The additional single-stage optical isolators prevent forward-propagating co-pump laser light 1608 from travelling all of the way to the counter-pump laser 1612 and prevent the reverse-propagating counter-pump laser light 1611 from travelling all of the way to the co-pump laser 1609. The isolator/monitor/amplifier 1700 further comprises optical combining and re-separating means (the partially-reflective mirror 1701). The partial reflector 1701 injects the co-pump and counter-pump laser lights into the Er-doped fiber, along with the signal lights, and then removes the co-pump and counter-pump laser lights from the signal lights after travelling through the Er-doped fiber. Thus, referring to FIGS. 20A and 20B, the optics between Port #5 and Port #4 make up an optical isolator which only lets light propagate in the forward direction (defined relative to the signal) and the optics between Port #7 and Port #2 make up another optical isolator which only lets light propagate in the reverse direction. The construction of these optical isolators for the lasers are similar to those for the signal, except that instead of going through the lens, mirror, back to the lens, the light goes in sequence through a collimating lens, through a mirror, and then through a second focusing lens.

The passage of both signal and laser light through isolator/monitor/amplifier 1700 of the present invention is presented in further detail, with references to FIGS. 21–24. Since the operation of the optical elements adjacent to each port were previously discussed, no further explanation is provided.

FIG. 21 and FIG. 22 illustrate optical pathways comprising the first pass through the isolator/monitor/amplifier 1700 in the forward and reverse directions, respectively, shown in FIG. 20A.

More particularly, FIG. 21 shows the operation of the isolator/monitor/amplifier 1700 during a first pass of signal light, in a forward direction.

As shown in FIG. 21, signal light enters isolator/monitor/amplifier 1700 through Port #1 (input fiber 801A), included in front four-fiber ferrule 815. The input signal light is then divided into an o-ray and an e-ray by the optical elements adjacent to Port #1. The o-ray and e-ray components of the input signal light are then collimated onto reflector 1701 by lens 806. The majority of the power included in the input signal light is reflected by reflector 1701. The remaining power from the input signal light not reflected by reflector 1701 is re-focused by lens 1702 onto the optical elements adjacent to Port #8, which recombine the o-ray and e-ray components thereof, and present the recombined input signal light to Port #8 for monitoring.

Concurrently, input laser light 1608 from a co-pump laser (not shown in FIG. 21) is input through Port #5 included in rear four-fiber ferrule 1708. The input laser light is divided into an o-ray component and an e-ray component, and is collimated onto reflector 1701 by lens 1702. Reflector 1701 allows all of the input laser light to pass through the reflector 1701, and, hence, the input laser light joins with the input signal light to be re-focused by lens 806 onto the optical components adjacent to output Port #4. The optical elements adjacent to output Port #4 recombine the o-ray component of the input signal light with the e-ray component of the input signal light, and, further, recombine the o-ray component of the input laser light with the e-ray component of the input laser light, and present the combined light to output Port #4, which exits the isolator/monitor/amplifier 1700 through fiber 810A. The output signal light is then transmitted along, for example, an Er-fiber 1610 of FIG. 16, which feeds the signal light back to isolator/monitor/amplifier 1700 for a second pass therethrough.

FIG. 22 shows the operation of the isolator/monitor/amplifier 1700 during the re-entry of residual counter-pump light, in a reverse direction. As shown in FIG. 22, light, most likely residual counter pump laser light traveling in the Er-fiber 1610, enters the isolator/monitor/amplifier 1700 through Port #4 (fiber 810A), is divided into an o-ray component and an e-ray component by the optical elements adjacent to Port #4, and is collimated by lens 806 onto reflector 1701, through which the residual counter pump laser light passes. Lens 1702 then re-focuses the residual counter pump laser light onto the optical elements adjacent to Port #5, and, by their operation explained previously, the residual counter pump laser light is not recombined to exit the isolator/monitor/amplifier 1700 through Port #5. In addition, at most 0.25% of reflected input monitor light is reflected from Port #8 by or through the optical elements adjacent to Port #8 (in which the light is divided into o-ray and e-ray components), and to reflector 1701, through which at most 0.0125% passes through.

FIG. 23 shows the operation of the isolator/monitor/amplifier 1700 during a second pass of signal light therethrough, in a forward direction. The signal light enters the isolator/monitor/amplifier 1700 as amplified signal light, through Port #2, fiber 801B, for the second pass therethrough. In passing through the optical elements adjacent to Port #2, the input signal light is divided into o-ray and e-ray components, as shown. The divided, amplified input signal light is then collimated by lens 806 onto reflector 1701, 95% of which is reflected back to lens 806, to eventually pass through the optical elements adjacent to Port #3, and out of isolator/monitor/amplifier 1700 through output fiber 810B.

A portion (5%) of the amplified input signal light passes through reflector 1701, and is re-focused by lens 1702 onto reflector 1750, which reflects a small percentage of the portion of the amplified signal light back through lens 1702 to reflector 1701. The reflected, amplified signal light is directed by lens 1702 and reflector 1701 onto the optical elements adjacent to Port #6, which recombines the o-ray and e-ray components thereof for output to Port #6 for output monitoring purposes.

Also shown in FIG. 23 is counter pump light 1611 which is output from Port #7 through the optical elements adjacent thereto (which divide the counter pump light into o-ray and e-ray components thereof). The divided counter pump light is collimated by lens 1702 onto reflector 1701, which allows passage of the divided counter pump light therethrough along the same path (but in opposite direction to) the amplified input signal light input through Port #2. The optical elements adjacent to Port #2 recombine the divided counter pump light so as to enter Port #2, and thence the Er-doped fiber 1610, in the reverse direction.

FIG. 24 shows the operation of the isolator/monitor/amplifier 1700 during a second pass of signal light therethrough, in directing residual co-pump laser light 1608 and the portion of amplified input signal light which is not reflected by reflector 1750 away from entering Port #7. The path that the residual co-pump laser light 1608 and unreflected amplified input signal follows until it impinges upon reflector 1701 is explained with reference to FIG. 23 and is not repeated herein. After residual co-pump laser light 1608 and 5% of the amplified input signal light passes through reflector 1701, it is re-focused by lens 1702 onto the optical components adjacent to Port #7, which do not allow the o-ray and e-ray components thereof to recombine, and thus prevents the residual co-pump laser light and the amplified input signal light from entering Port #7.

Figure 25:
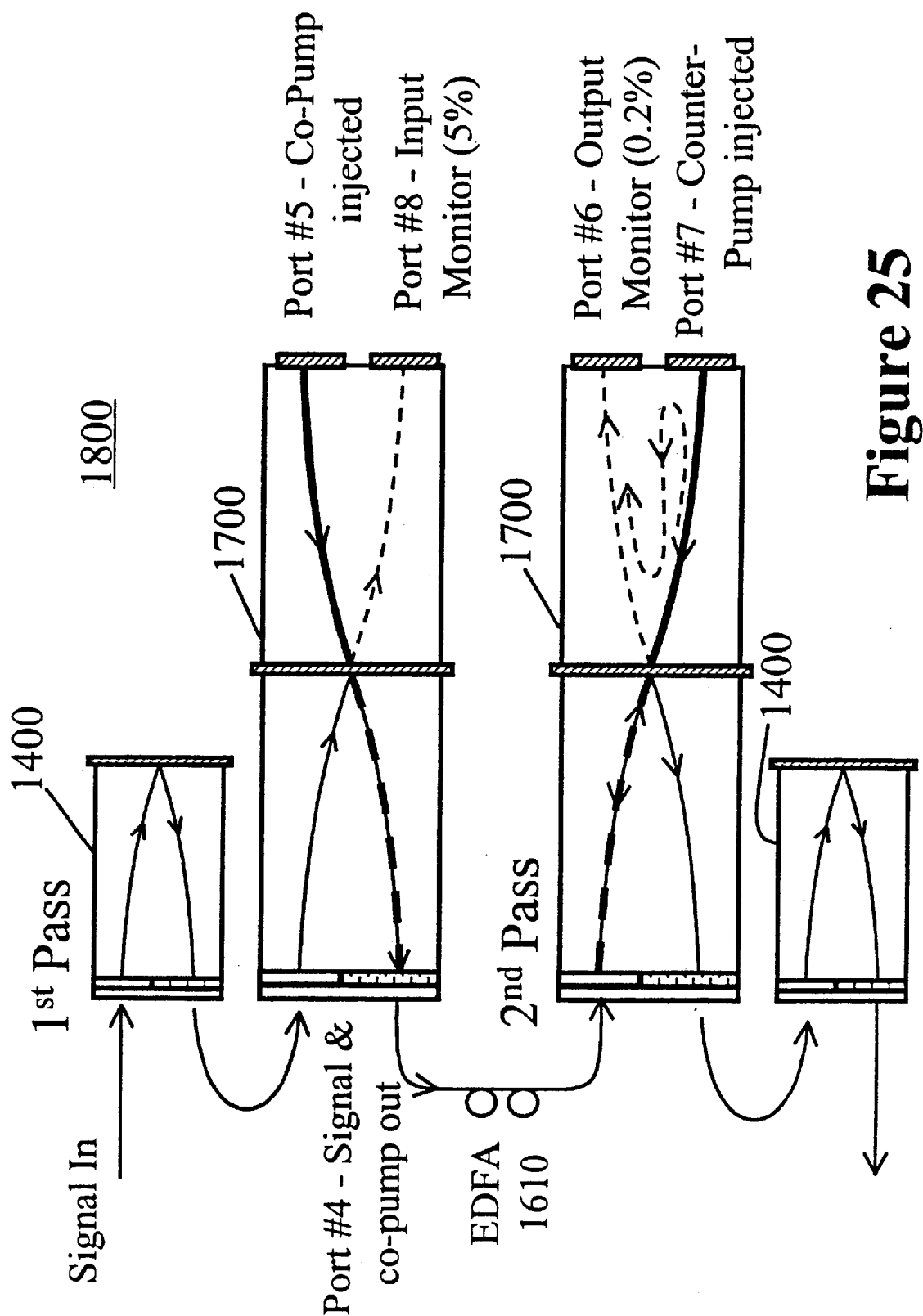
FIG. 25 is a schematic side view of the loci of light ray paths during first and second passes through a double-stage set of integrated optical passive components comprising a twin single-stage isolator in series arrangement with the integrated optical passive component of FIG. 17.

The integrated set of optical passive components, isolator/monitor/amplifier 1700, is a single-stage isolation device. For many applications, this may not be adequate. Therefore, FIG. 25 illustrates a polarization independent isolator 1800 including integrated optical components with double stage isolation. In the polarization independent isolator 1800, double-stage isolation is achieved by using an instance of the second embodiment of the present invention, isolator 1400, in cascade arrangement with an instance of the sixth embodiment, isolator/monitor/amplifier 1700, of the present invention. The two isolators of FIG. 25 are disposed in a sequential arrangement such that the signal makes a first pass through isolator 1400 followed by a first pass through isolator/monitor/amplifier 1700 and then passes to the Er-doped fiber (EDF) 1610. This double pass through the two isolators 1400 and 1700 in series comprises double-stage isolation at the input to the EDF 1610. The operation of either isolator 1400 or isolator/monitor/amplifier 1700 is as discussed previously, however. After passing through the EDF 1610, the signal makes its second pass through isolator/monitor/amplifier 1700 as described previously. After this second pass through isolator/monitor/amplifier 1700, the signal is once again directed to isolator 1400 to make a second pass therethrough using the second set of fibers in the four-fiber ferrule. These consecutive passes through isolator/monitor/amplifier 1700 followed by isolator 1400 comprise double-stage isolation at the output end of the EDF 1610.

Although a few preferred embodiments of the present invention have been shown and described, it would be appreciated by those skilled in the art that changes may be made in this embodiment without departing from the principles and spirit of the invention, the scope of which is defined in the claims and their equivalents.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An optical isolator including an input fiber carrying input light and an output fiber and comprising:
   a birefringent walk-off plate dividing the input light into an ordinary ray sub-light and an extraordinary ray sub-light thereof, and deflecting the extraordinary ray sub-light thereof;
   a reciprocally rotating optical element provided adjacent to the birefringent walk-off plate and reciprocally rotating the polarization of each of the sub-lights by 45° in a first direction;
   at least one lens collimating the input light and focusing output light;
   a mirror reflecting the collimated, divided, reciprocally rotated sub-lights; and
   a Faraday rotator provided adjacent to the birefringent walk-off plate and to the reciprocally rotating optical element, non-reciprocally rotating the polarization of the sub-lights by 45° in the first direction, wherein input light received from the input fiber travels in a forward direction from the input fiber to the birefringent walk-off plate, to the reciprocally rotating optical element, to the mirror, back to the Faraday rotator, and back to the birefringent walk-off plate and the sub-lights of the forward-traveling input light are recombined by the birefringent walk-off plate into output light exiting the isolator through the output fiber, whereas input light received from the output fiber travels in a reverse direction opposite to that of the forward direction and the sub-lights thereof are deflected away from each other during each traversal of the birefringent walk-off plate.

2. The optical isolator as recited in claim 1, wherein the birefringent walk-off plate divides the reverse direction input light into an ordinary ray sub-light and an extraordinary ray sub-light and deflects the extraordinary ray sub-light, the Faraday rotator non-reciprocally rotates the polarization of the reverse direction sub-lights by 45° in the first direction, the at least one lens collimates and directs the reverse direction sub-lights onto the mirror, which reflects them to the reciprocally rotating optical element which rotates their polarizations by 45° in the first direction, and the birefringent plate directs the reverse direction sub-lights away from entering the input fiber.

3. The optical isolator as recited in claim 1, wherein the at least one lens is disposed between the mirror and the birefringent plate and the distance from the at least one lens to the mirror is the same as the distance from the at least one lens to the far side relative to the mirror of the birefringent walk-off plate.

4. The optical isolator as recited in claim 1, wherein the optical isolator is a single stage polarization independent optical isolator.

5. The optical isolator as recited in claim 1, further comprising a ferrule including the input fiber and the output fiber.

6. The optical isolator as recited in claim 1, further comprising:
   a polarization rotation compensator provided adjacent to the reciprocally rotating optical element and providing a range of polarization angles with respect to wavelength of the sub-lights input thereto.

7. The optical isolator as recited in claim 6, wherein the birefringent walk-off plate divides the reverse direction input light into an ordinary ray sub-light and an extraordinary ray sub-light and deflects the extraordinary ray sub-light, the Faraday rotator non-reciprocally rotates the polarizations of the reverse direction sub-lights by 45° in the first direction, the at least one lens collimates and directs the reverse direction sub-lights onto the mirror, which reflects their polarizations to the polarization rotation compensator and, upon exit thereof, to the reciprocally rotating optical element which rotates them by 45° in the first direction, and the birefringent plate directs the reverse direction sub-lights away from entering the input fiber.

8. The optical isolator as recited in claim 6, wherein the at least one lens is disposed between the mirror and the birefringent walk-off plate and the distance from the at least one lens to the mirror is the same as the distance from the at least one lens to the far side relative to the mirror of the birefringent walk-off plate.

9. The optical isolator as recited in claim 6, wherein the optical isolator is a single stage broadband polarization independent optical isolator.

10. The optical isolator as recited in claim 1, wherein the reciprocally rotating optical element includes a $\lambda/2$ plate.

11. An apparatus coupled to an input fiber and to an output fiber and receiving from the input fiber input light traveling in a forward propagation direction and input from the output fiber light traveling in a reverse propagation direction, said apparatus comprising:
    at least one lens collimating the input light and focusing output light;
    a mirror reflecting the input light traveling in a forward propagation direction and in a reverse propagation direction; and
    optical isolator means for transmitting the input light traveling in the forward direction and preventing transmission of the input light traveling in the reverse direction, said optical isolator means dividing, deflecting, and rotating the input light such that input light entering the apparatus from the input fiber passes through the optical isolator means to the mirror, and is reflected by the mirror to the optical isolator means and passes therethrough to the output fiber, whereas input light traveling in the reverse propagation direction from the output fiber is prevented from entering the input fiber by the optical isolator means, wherein the optical isolator means comprises a single Faraday Rotator, wherein the input light passes through the single Faraday Rotator exactly once.

* * * * *